US010372282B2

(12) United States Patent
Blondin et al.

(10) Patent No.: US 10,372,282 B2
(45) Date of Patent: Aug. 6, 2019

(54) CAPACITIVE COUPLING REDUCTION IN TOUCH SENSOR PANELS

(71) Applicant: Apple Inc., Cupertino, CA (US)

(72) Inventors: Christophe Blondin, Sunnyvale, CA (US); Christian M. Sauer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/829,763

(22) Filed: Dec. 1, 2017

(65) Prior Publication Data
US 2018/0157354 A1   Jun. 7, 2018

Related U.S. Application Data

(60) Provisional application No. 62/429,043, filed on Dec. 1, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04107* (2013.01)

(58) Field of Classification Search
None
See application file for complete search history.

(56) References Cited

U.S. PATENT DOCUMENTS

| 5,483,261 A | 1/1996 | Yasutake |
| 5,488,204 A | 1/1996 | Mead et al. |
| 5,574,262 A | 11/1996 | Petty |
| 5,825,352 A | 10/1998 | Bisset et al. |

(Continued)

FOREIGN PATENT DOCUMENTS

| CN | 102375603 A | 3/2012 |
| EP | 2267791 A2 | 12/2010 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Christopher J Kohlman
(74) *Attorney, Agent, or Firm* — Kubota & Basol LLP

(57) ABSTRACT

Touch sensor panel configurations and methods for improving touch sensitivity of some or all of the electrodes or portions of the touch sensor panel are disclosed. The touch sensor panel configurations can allow increased speed at which the panel can operate. In some examples, the performance of a given touch electrode can differ from the performance of another touch electrode due to differences in capacitance and/or resistance. The performance of the touch sensor panel can be limited by the touch electrode with the lowest performance relative to the other touch electrodes. The configurations and methods can increase the performance of the touch sensor panel by minimizing the capacitive coupling and/or resistance of touch electrodes. Examples of the disclosure can provide configurations of touch sensor panels and methods for improving optical uniformity of the panel.

17 Claims, 16 Drawing Sheets

(56) References Cited

U.S. PATENT DOCUMENTS

| | | | |
|---|---|---|---|
| 5,835,079 | A | 11/1998 | Shieh |
| 5,844,506 | A | 12/1998 | Binstead |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 6,847,354 | B2 | 1/2005 | Vranish |
| 7,015,894 | B2 | 3/2006 | Morohoshi |
| 7,184,064 | B2 | 2/2007 | Zimmerman et al. |
| 7,570,064 | B2 | 8/2009 | Roziere |
| 7,663,607 | B2 | 2/2010 | Hotelling et al. |
| 8,149,002 | B2 | 4/2012 | Ossart |
| 8,159,213 | B2 | 4/2012 | Roziere |
| 8,479,122 | B2 | 7/2013 | Hotelling et al. |
| 8,587,533 | B2 | 11/2013 | Nishihara |
| 8,614,690 | B2 | 12/2013 | Grunthaner et al. |
| 8,698,770 | B2 | 4/2014 | Chen |
| 8,770,033 | B2 | 7/2014 | Roziere |
| 8,829,926 | B2 | 9/2014 | Zachut |
| 8,917,256 | B2 | 12/2014 | Roziere |
| 8,923,014 | B2 | 12/2014 | Kim |
| 9,007,343 | B1 | 4/2015 | Ludden |
| 9,035,903 | B2 | 5/2015 | Binstead |
| 9,104,283 | B2 | 8/2015 | Roziere |
| 2002/0000977 | A1 | 1/2002 | Vranish |
| 2006/0097733 | A1 | 5/2006 | Roziere |
| 2006/0197753 | A1 | 9/2006 | Hotelling |
| 2008/0284261 | A1 | 11/2008 | Andrieux |
| 2010/0052700 | A1 | 3/2010 | Yano |
| 2010/0123681 | A1 | 5/2010 | Wu |
| 2010/0201647 | A1 | 8/2010 | Verweg |
| 2011/0169783 | A1 | 7/2011 | Wang |
| 2011/0216018 | A1 | 9/2011 | Kim |
| 2011/0234491 | A1 | 9/2011 | Nurmi |
| 2012/0008266 | A1 | 1/2012 | Nomura |
| 2012/0044662 | A1 | 2/2012 | Kim |
| 2012/0113038 | A1 | 5/2012 | Chen |
| 2012/0187965 | A1 | 7/2012 | Roziere |
| 2012/0188200 | A1 | 7/2012 | Roziere |
| 2013/0033450 | A1 | 2/2013 | Coulson |
| 2013/0100038 | A1* | 4/2013 | Yilmaz .................. G06F 3/044 345/173 |
| 2013/0135247 | A1 | 5/2013 | Na |
| 2013/0307776 | A1 | 11/2013 | Roziere |
| 2014/0043292 | A1 | 2/2014 | Hashimoto |
| 2014/0132335 | A1 | 5/2014 | Rauhala |
| 2014/0320199 | A1* | 10/2014 | Trend ..................... G06F 3/044 327/517 |
| 2015/0035792 | A1 | 2/2015 | Roziere |
| 2015/0068897 | A1 | 3/2015 | Neel |
| 2016/0266693 | A1 | 9/2016 | Chen et al. |
| 2016/0306458 | A1* | 10/2016 | Hong ..................... G06F 3/044 |
| 2017/0357369 | A1* | 12/2017 | Liu ........................ G06F 3/044 |
| 2018/0157353 | A1* | 6/2018 | Sleeman ................ G01D 5/241 |

FOREIGN PATENT DOCUMENTS

| | | |
|---|---|---|
| EP | 2392994 A1 | 12/2011 |
| FR | 2756048 A1 | 5/1998 |
| JP | 2000-163031 A | 6/2000 |
| JP | 2002-342033 A | 11/2002 |
| JP | 2010218542 A | 9/2010 |
| WO | WO2004023067 A2 | 3/2004 |
| WO | WO2007060324 A1 | 5/2007 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

CAPACITIVE COUPLING REDUCTION IN TOUCH SENSOR PANELS

CROSS-REFERENCE TO RELATED APPLICATIONS

This application claims benefit of U.S. Provisional Patent Application No. 62/429,043, filed Dec. 1, 2016, which is hereby incorporated by reference in its entirety.

FIELD OF THE DISCLOSURE

This relates generally to touch sensor panels and, more particularly, to touch electrodes of a touch sensor panel for reducing capacitive coupling.

BACKGROUND OF THE DISCLOSURE

Many types of input devices are presently available for performing operations in a computing system, such as buttons or keys, mice, trackballs, joysticks, touch sensor panels, touch screens, and the like. Touch screens, in particular, are popular because of their ease and versatility of operation, as well as their declining price. Touch screens can include a touch sensor panel, which can be a clear panel with a touch-sensitive surface, and a display device that can be positioned partially or fully behind the panel so that the touch-sensitive surface can cover at least a portion of the viewable area of the display device. Touch screens can allow a user to perform various functions by touching the touch sensor panel using a finger, stylus, or other object at a location often dictated by a user interface (UI) being displayed by the display device. In general, touch screens can recognize a touch and the position of the touch on the touch sensor panel, and the computing system can then interpret the touch in accordance with the display appearing at the time of the touch and thereafter perform one or more actions based on the touch. In the case of some touch sensing systems, a physical touch on the display is not needed to detect a touch. For example, in some capacitive-type touch sensing systems (e.g., far field touch sensing systems), fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates (e.g., touch electrodes) made of materials such as Indium Tin Oxide (ITO). In order to detect such changes, in some examples, the touch electrodes can be coupled to sense circuitry using substantially transparent or non-transparent sense connections (e.g., traces) that can be composed of any electrically conductive material, such as ITO. It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

The touch electrodes can be varied in size and/or location to appropriately route the traces along the touch sensor panel to the sense circuitry. In some instances, the increased capacitive coupling of the larger-sized touch electrodes can affect the performance of the touch electrodes, thereby hindering touch sensitivity of the touch panel and limiting the speed at which the touch panel can operate.

SUMMARY OF THE DISCLOSURE

Touch events can be sensed on touch sensor panels by detecting changes in the self-capacitance and/or mutual capacitance of the conductive plates or touch electrodes. To detect such changes, in some examples, the touch electrodes can be coupled to sense circuitry using routing traces. In some instances, increasing the performance of one or more touch electrodes can improve touch sensitivity of some or all of the electrodes or portions of the touch sensor panel, and it can allow increased speed at which the touch sensor panel can operate. In some examples, the performance of a given touch electrode can differ from that of another touch electrode due to, e.g., differences in capacitance and/or resistance. The performance of the touch sensor panel can be limited by the touch electrode with the lowest performance relative to the performance of the other touch electrodes. Examples of the disclosure provide configurations of touch electrodes and methods for increasing the performance of the touch sensor panel by reducing the capacitive coupling and/or resistance of touch electrodes. Examples of the disclosure can provide configurations of touch sensor panels and methods for improving optical uniformity of the touch sensor panel.

DETAILED DESCRIPTION

In the following description of examples, reference is made to the accompanying drawings that form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Touch events can be sensed on the touch sensor panels by detecting changes in the self-capacitance and/or mutual capacitance of the conductive plates or touch electrodes. In order to detect such changes, in some examples, the touch electrodes can be coupled to sense circuitry using routing traces. In some instances, increasing the performance of one or more touch electrodes can improve the touch sensitivity of some or all of the electrodes or portions of the panel, and it can allow increased speed at which the touch sensor panel can operate. In some examples, the performance of a given touch electrode can differ from that of another touch electrode due to, e.g., differences in capacitance and/or resistance. The performance of the touch sensor panel can be limited by the touch electrode with the lowest performance relative to the other touch electrodes. Examples of the disclosure provide configurations of touch electrodes and methods for reducing capacitive coupling and/or resistance of touch electrodes without compromising touch sensitivity. In some instances, reducing the capacitive coupling and/or resistance of the touch electrode with the lowest performance relative to the other touch electrodes can increase the performance of the touch sensor panel. Examples of the disclosure can provide configurations of touch sensor panels and methods for improving optical uniformity of the touch sensor panel.

Figure 1A:
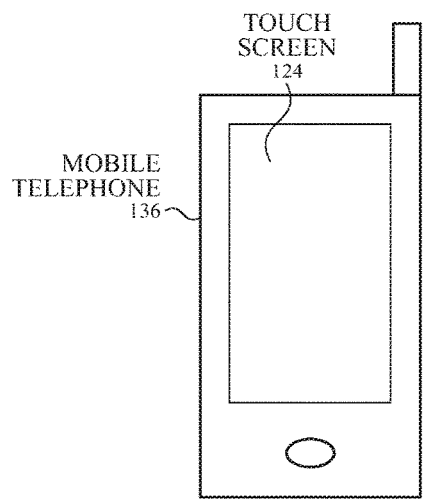
FIGS. 1A-1D illustrate an example mobile telephone, an example media player, an example personal computer, and an example tablet computer that can include an exemplary touch screen according to examples of the disclosure.
Figure 1B:
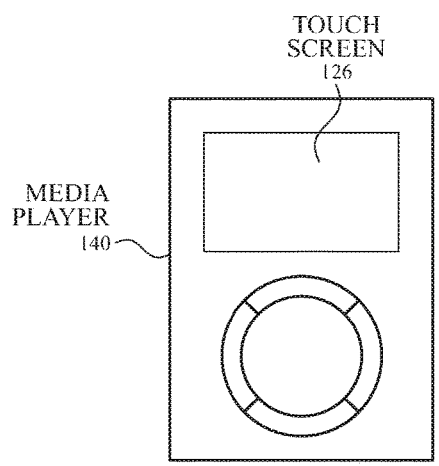
Figure 1C:
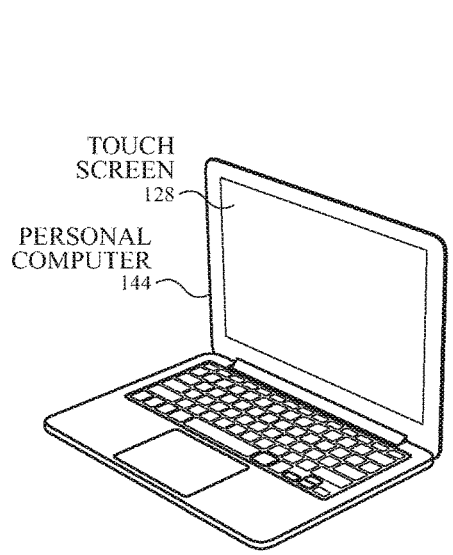
Figure 1D:
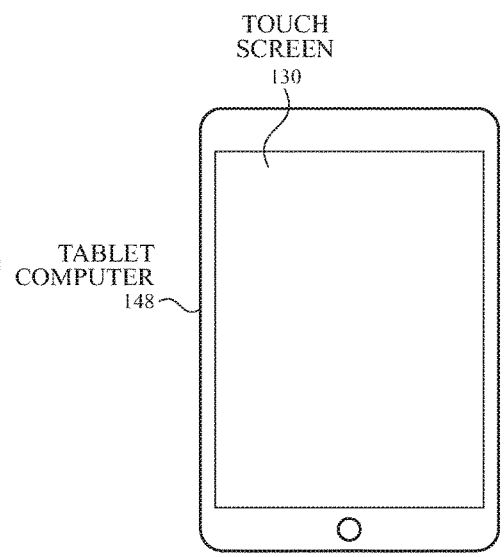

FIGS. 1A-1D illustrate an example mobile telephone, an example media player, an example personal computer, and an example tablet computer that can include an exemplary touch screen according to examples of the disclosure. FIG. 1A illustrates an example mobile telephone 136 that includes a touch screen 124. FIG. 1B illustrates an example digital media player 140 that includes a touch screen 126 and also a separate trackpad that can include a touch sensor panel. FIG. 1C illustrates an example personal computer 144 that includes a touch screen 128. FIG. 1D illustrates an example tablet computer 148 that includes a touch screen 130. It is understood that the above touch screens can be implemented in other devices as well, including wearable devices.

In some examples, touch screens 124, 126, 128, and 130 and/or the trackpad can be based on self-capacitance. A self-capacitance based touch system can include a matrix of small, individual plates of conductive material that can be referred to as touch electrodes (as described below with reference to touch screen 220 in FIG. 2). For example, a touch screen can include a plurality of individual touch electrodes, where one or more touch electrodes can identify or represent a unique location on the touch screen at which touch or proximity (i.e., a touch or proximity event) is to be sensed, and one or more touch electrodes may be electrically isolated from the other touch electrodes in the visible portion of the touch screen/panel; in some instances, such touch electrodes may be connected off-panel or via circuitry. Such a touch screen can be referred to as a pixelated self-capacitance touch screen, though it is understood that, in some examples, the touch electrodes on the touch screen can be used to perform scans other than self-capacitance scans on the touch screen (e.g., mutual capacitance scans). During operation, a touch electrode can be stimulated with an AC waveform, and the self-capacitance to ground of the touch electrode can be measured. As an object approaches the touch electrode, the self-capacitance to ground of the touch electrode can change. This change in the self-capacitance of the touch electrode can be detected and measured by the touch sensing system to determine the positions of multiple objects when they touch, or come in proximity to, the touch screen. In some examples, a touch screen can be capable of resolving multiple touches.

In some examples, touch screens 124, 126, 128, and 130 and/or the trackpad can be based on mutual capacitance. A mutual capacitance-based touch system can include drive and sense lines that may cross over each other on different layers or may be adjacent to each other on the same layer. The crossing or adjacent locations can be referred to as touch nodes or electrodes. During operation, the drive line can be stimulated with an AC waveform, and the mutual capacitance of the touch electrode can be measured. As an object approaches the touch electrode, the mutual capacitance of the touch electrode can change. This change in the mutual capacitance of the touch electrode can be detected and measured by the touch sensing system to determine the positions of multiple objects when they touch, or come in proximity to, the touch screen.

Figure 2:
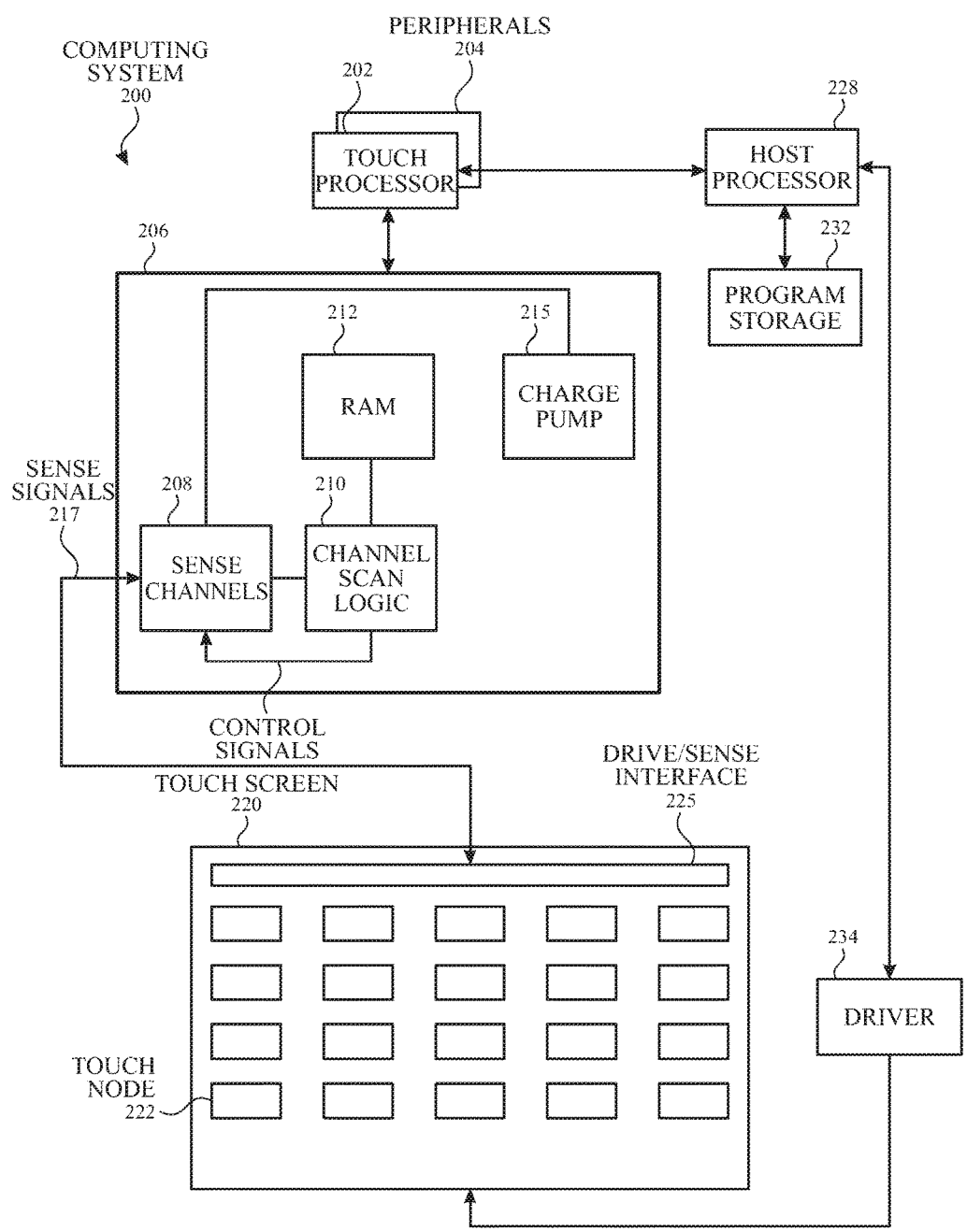
FIG. 2 illustrates a block diagram of an example computing system, including one implementation of an example self-capacitance touch screen according to examples of the disclosure.

FIG. 2 illustrates a block diagram of an example computing system including one implementation of an example self-capacitance touch screen according to examples of the disclosure. It is understood that the computing system can instead include a mutual capacitance touch screen, as described above, though the examples of the disclosure will be described assuming a self-capacitance touch screen is provided. Computing system 200 can be included in, for example, mobile telephone 136 illustrated in FIG. 1A, digital media player 140 illustrated in FIG. 1B, personal computer 144 included in FIG. 1C, tablet computer 148 included in FIG. 1D, or any mobile or non-mobile computing device that includes a touch screen or trackpad, including a wearable device. Computing system 200 can include a touch sensing system, including one or more touch processors 202, peripherals 204, a touch controller 206, and touch sensing circuitry (described in more detail below). Peripherals 204 can include, but are not limited to, random access memory (RAM) or other types of memory or storage, watchdog timers, and the like. Touch controller 206 can include, but is not limited to, one or more sense channels 208 and channel scan logic 210. Channel scan logic 210 can access RAM 212, autonomously read data from sense channels 208, and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202, and peripherals 204 can be integrated into a single application specific integrated circuit (ASIC), and in some examples, they can be integrated with touch screen 220 itself.

Touch screen 220 can include touch sensing circuitry that can include a capacitive sensing medium having a plurality of electrically isolated touch electrodes 222 (e.g., a pixelated self-capacitance touch screen). In some instances, the plurality of touch electrodes 222 can be electrically isolated in the visible portion of the touch sensor panel but may be connected off-panel or via circuitry. Although FIG. 2 illustrates a touch screen 220, it should be understood that FIG. 2 is also generally applicable to a trackpad (e.g., a touch sensor panel without a display). Touch electrodes 222 can be coupled to sense channels 208 in touch controller 206, can be driven by stimulation signals from the sense channels through drive/sense interface 225, and can be sensed by the sense channels through the drive/sense interface 225 as well, as described above. Labeling the conductive plates used to detect touch (i.e., touch electrodes 222) as "touch node," touch electrodes can be particularly useful when touch screen 220 is viewed as capturing an "image" of touch (e.g., a "touch image"). In other words, after touch controller 206 has determined an amount of touch detected at one or more touch electrodes 222 in touch screen 220, the pattern of touch electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as driver 234. The driver 234 can provide voltages on select (e.g., gate) lines to one or more pixel transistors, and it can provide data signals along data lines to these same transistors to control the pixel display image, as described in more detail below. Host processor 228 can use the driver 234 to generate a display image on touch screen 220, such as a display image of a user interface (UI), and it can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 illustrated FIG. 2) and executed by touch processor 202, or they can be stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus, or device; a portable computer diskette (magnetic), a random access memory (RAM) (magnetic), a read-only memory (ROM) (magnetic), or an erasable programmable read-only memory (EPROM) (magnetic); a portable optical disc such as a CD, CD-R, CD-RW, DVD, DVD-R, or DVD-RW; or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

Figure 12:
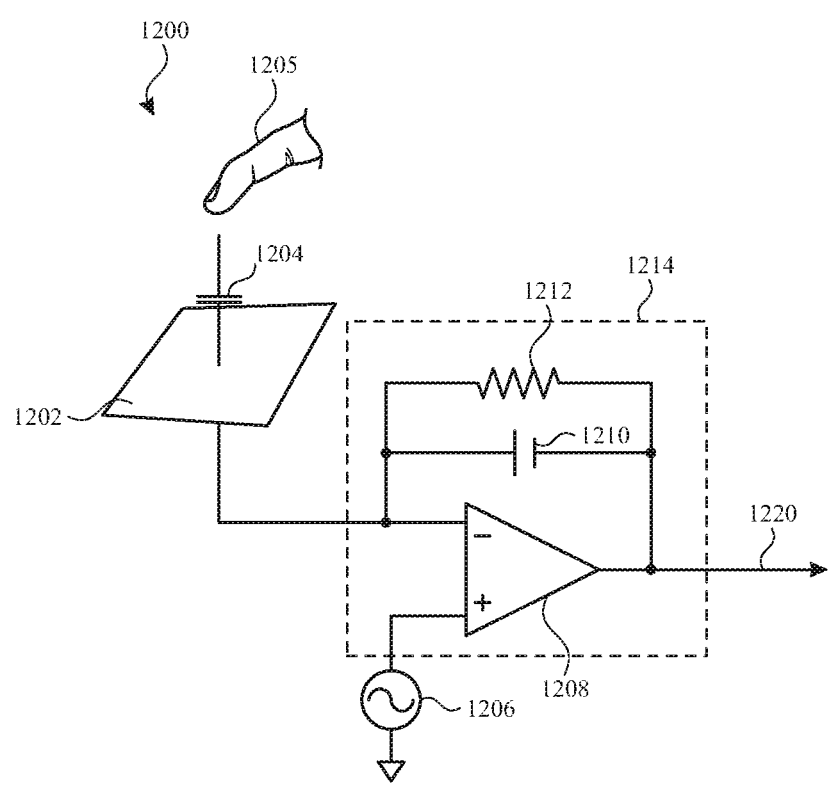
FIG. 12 illustrates exemplary touch sense circuitry corresponding to a self-capacitance touch electrode and sensing circuit according to examples of the disclosure.

Referring to FIG. 12, exemplary touch sense circuitry 1200 corresponding to a self-capacitance touch electrode 1202 and sensing circuit 1214 according to examples of the disclosure is illustrated. Touch electrode 1202 can correspond to touch node 222 illustrated in FIG. 2. Touch electrode 1202 can have an inherent self-capacitance to ground associated with it and also an additional self-capacitance to ground that is formed when an object, such as finger 1205, is in proximity to or touching the electrode. The total self-capacitance to ground of touch electrode 1202 can be illustrated as capacitance 1204. Touch electrode 1202 can be coupled to sensing circuit 1214. Sensing circuit 1214 can include an operational amplifier 1208, feedback resistor 1212, and feedback capacitor 1210, although other configurations can be employed. For example, feedback resistor 1212 can be replaced by a switched capacitor resistor in order to minimize a parasitic capacitance effect that can be caused by a variable feedback resistor. Touch electrode 1202 can be coupled to the inverting input (−) of operational amplifier 1208. An AC voltage source 1206 (Vac) can be coupled to the non-inverting input (+) of operational amplifier 1208. Touch sense circuitry 1200 can be configured to sense changes in the total self-capacitance 1204 of the touch electrode 1202 induced by a finger or object either touching or in proximity to the touch sensor panel. Output 1220 can be used by a processor to determine the presence of a proximity or touch event, or the output can be inputted into a discrete logic network to determine the presence of a proximity or touch event.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in the display, such as one or more pixel transistors (e.g., thin film transistors (TFTs)), gate lines, data lines, pixel electrodes, and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 3A:
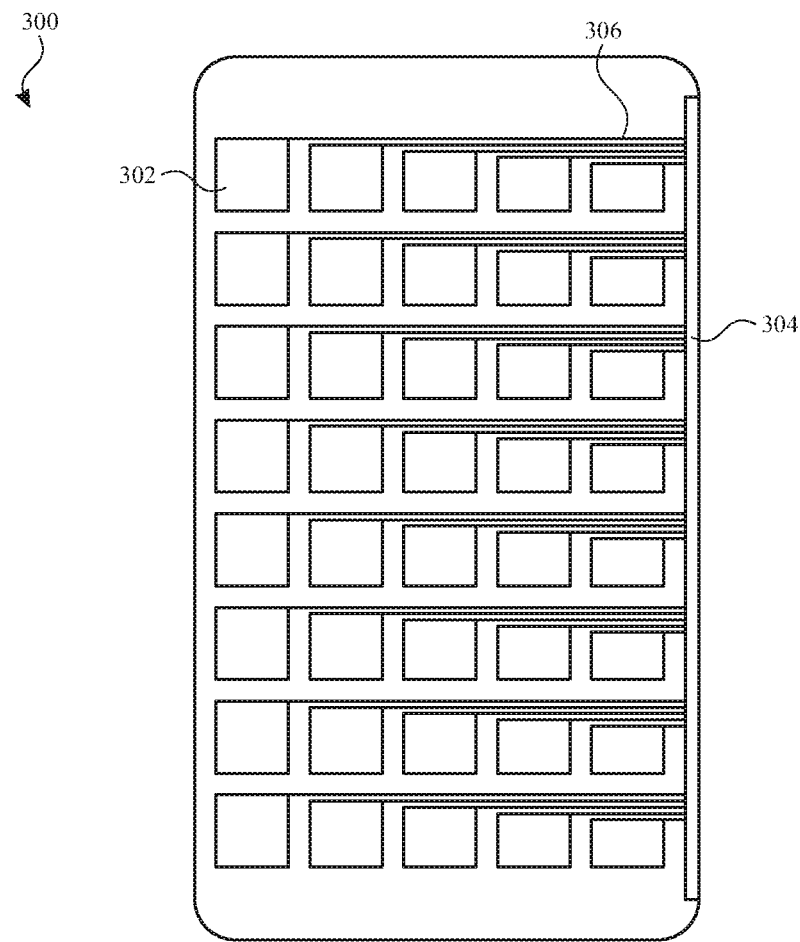
FIG. 3A illustrates an exemplary touch sensor panel, including a plurality of touch electrodes arranged in a matrix configuration according to examples of the disclosure.

Referring to FIG. 3A, an exemplary touch sensor panel including a plurality of touch electrodes arranged in a matrix configuration according to examples of the disclosure is illustrated. Touch sensor panel 300 can include a plurality of individual touch electrodes 302, with one or more touch electrodes identifying or representing a unique location on the touch sensor panel at which touch or proximity (i.e., a touch or proximity event) can be sensed. One or more touch electrodes 302 can be electrically isolated from the other touch electrodes 302 in the touch sensor panel 300. In some instances, the electrical isolation may be in the visible portion of the panel, but the electrodes may be connected off-panel or via circuitry. Touch electrodes 302 can be coupled to sense circuitry 304 at one or more edges (e.g., the right edge) of the touch sensor panel 300 using routing traces 306. Touch electrodes 302 and routing traces 306 can be located on the same layer of touch sensor panel stackup. Touch electrodes 302 and routing traces 306 can include a conductive material (e.g., ITO). It should be understood that, in some instances, the traces may not be routed off-panel but instead may be routed from the visible portion of the touch sensor panel.

In some examples, sense circuitry 304 can be located at any one or more edges (e.g., top, left, bottom, and/or right edges) and/or one or more corners of touch sensor panel 300. In some examples, touch electrodes 302 can be partitioned into quadrants within touch sensor panel 300 such that the touch electrodes 302 in one or more quadrants can be coupled to different sense circuitry along the edges and/or corners of touch sensor panel 300 (e.g., a quadrant of touch electrodes can be coupled to sense circuitry at the top edge of the touch sensor panel, a quadrant of touch electrodes can be coupled to sense circuitry at the left edge of the touch sensor panel, a quadrant of touch electrodes can be coupled to sense circuitry at the bottom edge of the touch sensor panel, and/or a quadrant of touch electrodes can be coupled to sense circuitry at the right edge of the touch sensor panel). In some examples, sense circuitry 304 can include sense channels 208 and/or drive/sense interface 225 of FIG. 2, sensing circuit 1214 of FIGS. 12 and 12B, and/or any other outputs (e.g., flex outputs, bus lines, switches, etc.). In some examples, sense circuitry can be on the touch sensor panel or on a separate touch controller.

In some examples, touch sensor panel 300 can sense the self-capacitance of touch electrodes 302 to detect touch and/or proximity activity on touch sensor panel 300. In some examples, touch sensor panel 300 can sense the mutual capacitance between touch electrodes 302 to detect touch and/or proximity activity on touch sensor panel 300. In some examples, touch electrodes 302 can be configured to be of any shape (e.g., diamond, square, rectangle, etc.) and/or can have wavy edges. It should be understood that routing traces 306 (or any other traces disclosed herein) need not be straight lines with sharp edges, but they can be rounded and/or wavy.

As illustrated in the figure, routing traces 306 for touch electrodes 302 in a given row can be routed such that they are electrically isolated from the other routing traces. To electrically isolate the routing traces 306, touch electrodes 302 in a given row can be configured to be progressively larger (e.g., taller) the further away a particular touch electrode 302 is from the sense circuitry 304. For example, referring to the figure, touch electrodes 302 located on the left side of the touch sensor panel 300 can be larger than the touch electrodes 302 located on the right side. In some examples, the touch electrodes 302 of a column can be of the same dimensions.

Figure 3B:
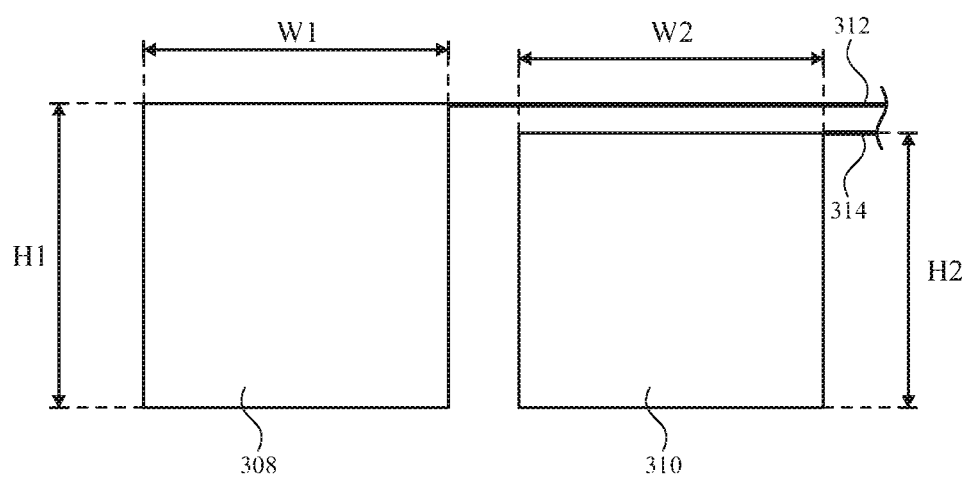
FIG. 3B illustrates a top view of two exemplary adjacent touch electrodes and routing traces according to examples of the disclosure.

FIG. 3B illustrates a top view of two exemplary adjacent touch electrodes and routing traces according to examples of the disclosure. The touch screen or panel can include touch electrodes 308 and 310 and their corresponding routing traces 312 and 314. Touch electrode 308 can be located further from sense circuitry (e.g., sense circuitry 304 of FIG. 3A) than touch electrode 310. The height of touch electrode 308 (H1) can be greater than the height of touch electrode 310 (H2). In some examples, the widths of touch electrodes 308 (W1) and 310 (W2) can be the same. With the area of the touch electrode 308 being larger than any other touch electrode in the same row (e.g., touch electrodes, such as touch electrode 310, closer to the sense circuitry), touch electrode 308 can have the largest capacitive coupling to other layers of the touch screen 300 (e.g., to a continuous lower guard layer that can be tied to a reference voltage or to ground). The large capacitive coupling can cause touch electrode 308 to have the lowest performance (relative to the other touch electrodes, such as touch electrode 310) in a given row, thereby limiting the touch sensitivity of the touch sensor panel and limiting the speed at which the touch sensor panel can operate.

Figure 4A:
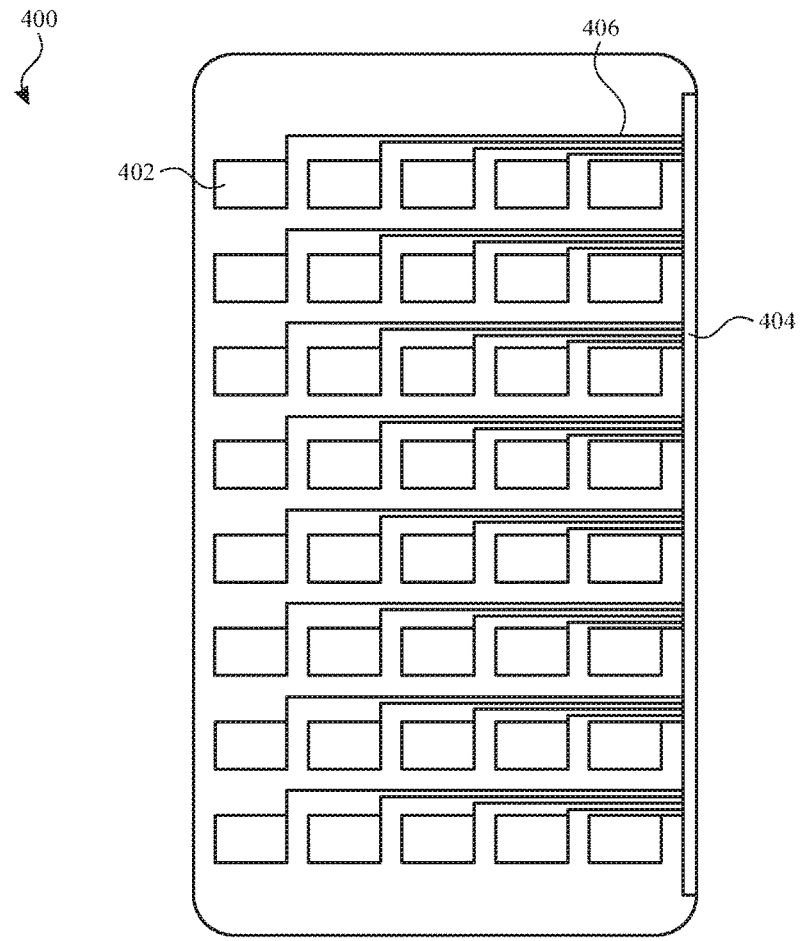
FIG. 4A illustrates an exemplary touch sensor panel, including a plurality of touch electrodes arranged in a matrix configuration according to examples of the disclosure.

Examples of the disclosure can include modifying the size of one or more touch electrodes to increase the performance of the touch sensor panel. FIG. 4A illustrates an exemplary touch sensor panel, including a plurality of touch electrodes arranged in a matrix configuration according to examples of the disclosure. Touch electrodes 402 can be coupled to sense circuitry 404 at one or more edges (e.g., the right edge) of the touch sensor panel 400 using routing traces 406. In some examples, touch electrodes 402 and routing traces 406 can include one or more properties and/or functions as described with reference to touch electrodes 302 and routing traces 306 of FIG. 3A, for example. In some examples, sense circuitry 404 (or other outputs) can be configured on touch sensor panel 400 as described above with reference to sense circuitry 304 (or other outputs) of FIG. 3A.

Figure 4B:
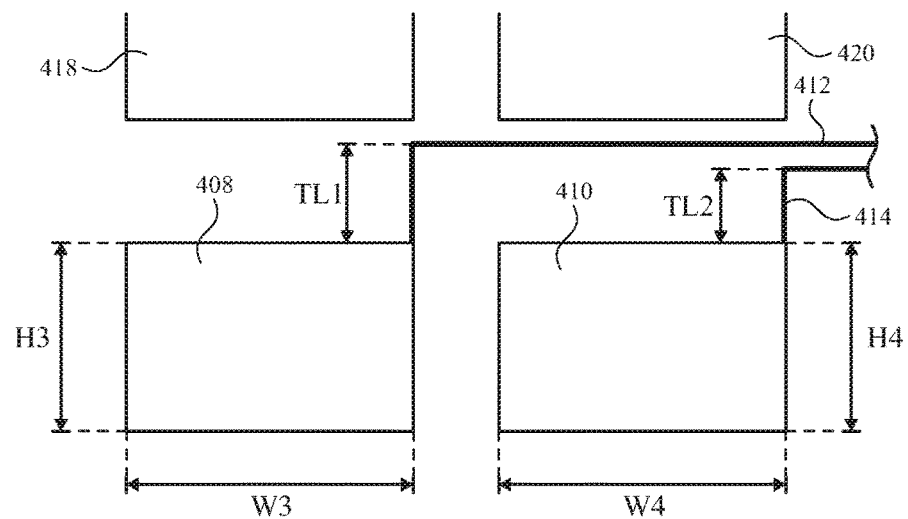
FIG. 4B illustrates a top view of two exemplary adjacent touch electrodes with equal sizes and routing traces according to examples of the disclosure.

FIG. 4B illustrates a top view of two exemplary adjacent touch electrodes with equal sizes and routing traces according to examples of the disclosure. Touch electrodes 408 and 410 can be coupled to sense circuitry (e.g., sense circuitry 404 illustrated in FIG. 4A) using routing traces 412 and 414. Touch electrode 408 can be located further from sense circuitry (e.g., sense circuitry 404 illustrated in FIG. 4A) than any other touch electrode in the same row. Touch electrode 410 can be adjacent to touch electrode 408 but closer to the sense circuitry. In some examples, the widths of touch electrodes 408 (W3) and 410 (W4) can be the same. The heights of touch electrodes 408 (H3) and 310 (H4) can also be the same. To electrically isolate routing traces in the same row (e.g., routing traces 412 and 414), the length of the routing traces can include an extension. One or more routing traces can be routed around the routing traces corresponding to the other touch electrodes. For example, routing trace 412 can be routed in a first direction (e.g., extended up) from touch electrode 408 by a length of TL1 at a first section to avoid electrically coupling to routing trace 414, and it can be routed in a second direction (e.g., to the right) to the sense circuitry at a second section. Similarly, routing trace 414 can be routed in a first direction (e.g., extended up) by a length of TL2 to avoid electrically coupling to other the routing traces, and it can be routed in a second direction (e.g., to the right) to the sense circuitry at a second section. In some examples, length TL2 can be less than length TL1. The trace lengths of the remaining routing traces in the same row can also be similarly routed. In some examples, the second section of a routing trace can intersect the first section at a non-orthogonal angle. Because the area of touch electrode (e.g., touch electrode 408) can be the same as any other touch electrode (e.g., touch electrode 410), the performance of one or more touch electrodes, including touch electrode 408, in a row can be the same. In some examples, the performance of all the touch electrodes included in touch sensor panel 400 can be the same.

Whereas the performance of the touch sensor panel in FIG. 3A may have been limited by the performance of the touch electrode located furthest from the sense circuitry, by configuring the touch electrodes to have the same properties (e.g., size, shape, etc.), the performance of the touch sensor panel can be determined by the performance of one or more touch electrodes. For example, in touch sensor panel 300 of FIGS. 3A-3B, the touch electrode (e.g., touch electrode 308 of FIG. 3B) furthest from sense circuitry (e.g., sense circuitry 304 in FIG. 3A) can have the largest capacitive coupling to other layers of the touch screen 300 because of the touch electrode's larger size (e.g., surface area) compared to the other touch electrodes that are closer to sense circuitry 304 in that row (e.g., touch electrode 310 of FIG. 3B). The configuration of touch sensor panel 300 can cause the furthest touch electrode from sense circuitry 304 (e.g., touch electrode 308) to have the lowest performance (e.g., as described above with reference to FIGS. 3A and 3B). This lowest performance can hinder touch sensitivity of the touch sensor panel and limit the speed at which the touch sensor panel can operate.

In some examples, touch electrodes 402 of touch sensor panel 400 can be configured to be the substantially the same size (e.g., have substantially the same surface area), thereby reducing the capacitive coupling and resistance of the furthest touch electrode 402 to sense circuitry (e.g., sense circuitry 404 of FIG. 4A). This configuration can reduce the lowest performance of the touch electrodes, thereby improving touch sensitivity of the touch sensor panel and increasing the speed at which the touch sensor panel can operate. In other examples, the height of the electrodes can vary as shown in FIGS. 3A and 3B, and the widths of the electrodes can also vary such that the area of the electrodes can be about the same, although such examples may result in decreased optical uniformity.

In some examples, touch electrodes 402 need not all be the same size to enhance the lowest performance. In some examples, touch electrodes 402 can vary in size. It should be understood that touch screen 400 need not always operate at a higher speed than touch screen 300 for power consumption purposes, but that this configuration can allow for improved touch detection when desired (e.g., allows touch screen 400 to operate at higher frequency channels). Additionally or alternatively, examples of the disclosure can include increasing the width of the longer traces to achieve a desired resistance. It should be understood that traces 406, 412, and/or 414 (or any other traces on touch screen 400) need not be straight lines with sharp edges, but they can be rounded and/or wavy.

Figure 5A:
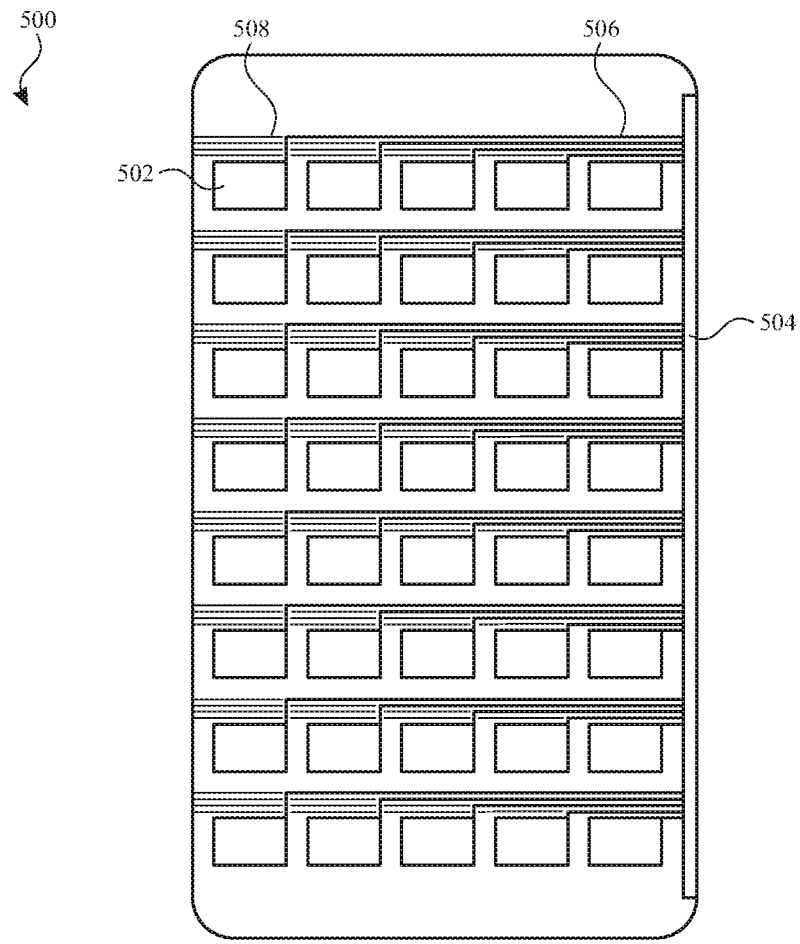
FIG. 5A illustrates an exemplary touch sensor panel including a plurality of touch electrodes arranged in a matrix configuration and a plurality of dummy sections according to examples of the disclosure.

In some instances, the change in area of the touch electrodes and extensions of the routing traces can alter the optical uniformity of the transparent conductive film (e.g., ITO forming the touch electrodes and/or routing traces). Examples of the disclosure can include utilizing one or more dummy sections (i.e., a section that does not carry a touch sensing signal that gets measured and/or processed) for enhancing the optical uniformity of the transparent conductive film. FIG. 5A illustrates an exemplary touch sensor panel, including a plurality of touch electrodes arranged in a matrix configuration and a plurality of dummy sections according to examples of the disclosure. Touch electrodes 502 can be coupled to sense circuitry 504 at the one edge (e.g., the right edge) of the touch sensor panel 500 using routing traces 506. Touch electrodes 502 and routing traces 506 can have one or more properties and/or functions as described with reference to touch electrodes 302 and routing traces 306 of FIG. 3A and/or touch electrodes 402 and routing traces 406 of FIG. 4A. In some examples, sense circuitry 504 (or other outputs) can be configured on touch sensor panel 500 as described above with reference to sense circuitry 304 (or other outputs) of FIG. 3A and/or sense circuitry 404 of FIG. 4A. Touch sensor panel 500 can further include dummy traces 508.

Figure 5B:
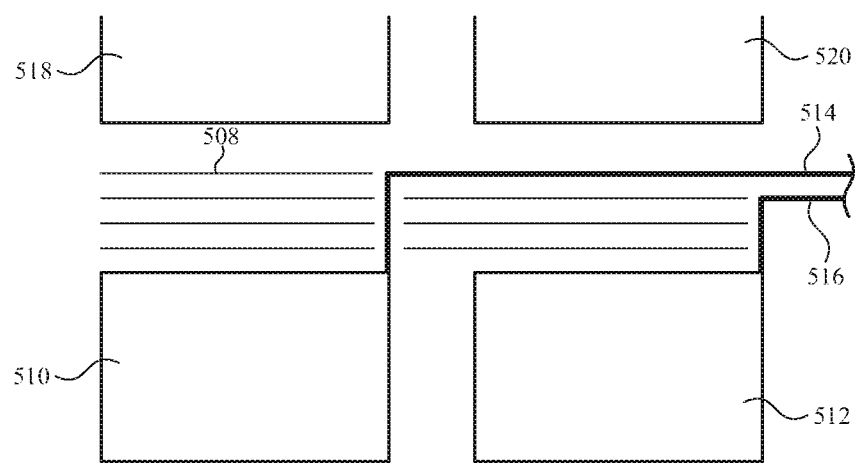
FIG. 5B illustrates a top view of two exemplary adjacent touch electrodes, routing traces, and a plurality of dummy sections according to examples of the disclosure.

FIG. 5B illustrates a top view of two exemplary adjacent touch electrodes, routing traces, and a plurality of dummy sections according to examples of the disclosure. Routing traces 514 and 516 can route signals from electrodes 510 and 512 to sense circuitry located along one or more edges of the touch sensor panel. In some examples, touch electrodes 510 and 512 and routing traces 514 and 516 can include one or more properties and/or functions as described above with reference to touch electrodes 408 and 410 and routing traces 412 and 414 of FIG. 4B.

As illustrated in FIG. 5B, the touch sensor panel can further include dummy traces 508. In some examples, these dummy traces can be oriented in same direction (e.g., in the first direction or the second direction of the routing traces as described above with reference to FIG. 4B) or in varying directions or patterns. In some examples, dummy traces 508 can be floating, coupled to ground, or coupled to a voltage source. In some examples, this voltage source can be the same AC voltage source that is used to stimulate the touch electrodes. Dummy traces 508 can be made of any transparent material (e.g., ITO). It should be understood that, in some instances, the transparent material may not be 100% transparent, but the dummy traces 508 can improve optical uniformity by reducing the amount of space where material is not present.

Dummy traces 508 can be located in an area between touch electrodes of adjacent rows while being electrically isolated from both the touch electrodes and routing traces. For example, dummy traces 508 can be located between touch electrode 510 (located in one row) and touch electrode 518 (located in an adjacent row). Dummy traces 508 can further be located between touch electrode 512 and touch electrode 520, while a gap can electrically separate routing trace 514 from dummy traces 508. Another gap can electrically separate routing trace 516 from dummy traces 508. In some examples, dummy traces 508 and routing traces 506 (including routing traces 514 and 516) can include the same material (e.g., ITO). In some examples, a plurality of dummy traces 508 can be located between touch electrodes of adjacent rows. In some examples, the dummy traces 508 can be linear or non-linear segments running along the same direction as the routing traces (e.g., routing trace 514 and 516). For example, the segments can be rounded, wavy, zig-zag shaped, etc. It should be understood that non-segments can be segments located on different planes (e.g., zig-zag shaped).

Whereas the optical appearance of the touch sensor panel in FIG. 4A may include areas of transparent conductive material (e.g., touch electrodes 402 and routing traces 406 of FIG. 4A) and areas absent any material, by including dummy traces, the optical uniformity of the touch sensor panel can be improved. For example, in touch sensor panel 400 of FIG. 4B, the configuration can leave gaps or empty spaces in the area between touch electrodes 408 and 418 and the area between routing trace 412 and touch electrode 410. Although the touch electrodes and traces can include a transparent conductive material, these gaps may be at least somewhat visible. In some examples, dummy traces 508 can include the same transparent conductive material as touch electrodes 502 (including touch electrodes 510 and 512) and/or routing traces 506 (including routing traces 514 and 516). In this way, the gaps between touch electrodes and routing traces can be less distinguishable, thereby enhancing the optical uniformity of touch sensor panel 500.

Figure 6A:
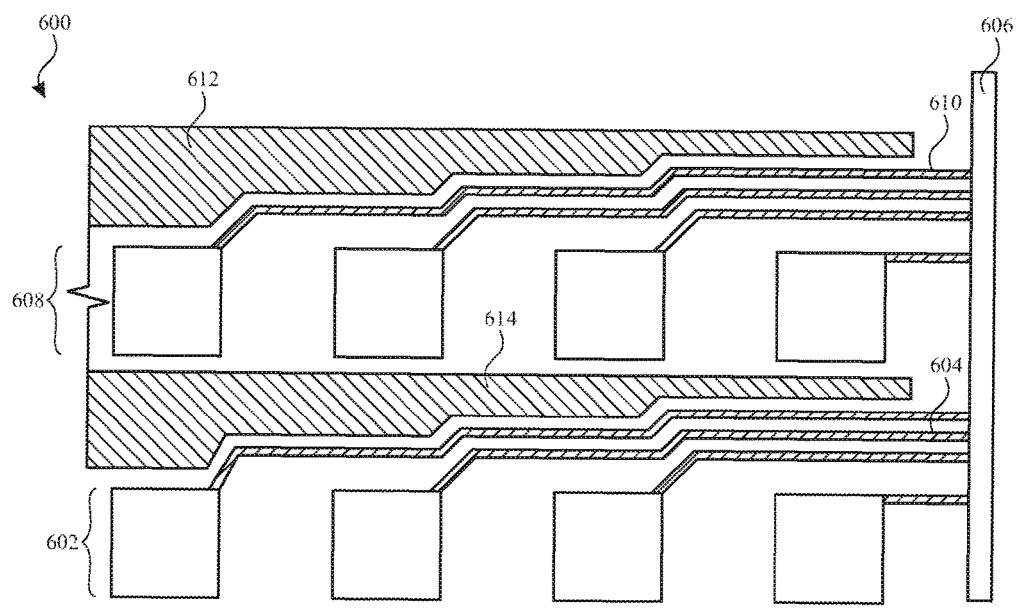
FIGS. 6A-6B illustrate top views of exemplary rows of touch electrodes, routing traces, and dummy traces adjacent to the routing traces according to examples of the disclosure.
Figure 6B:
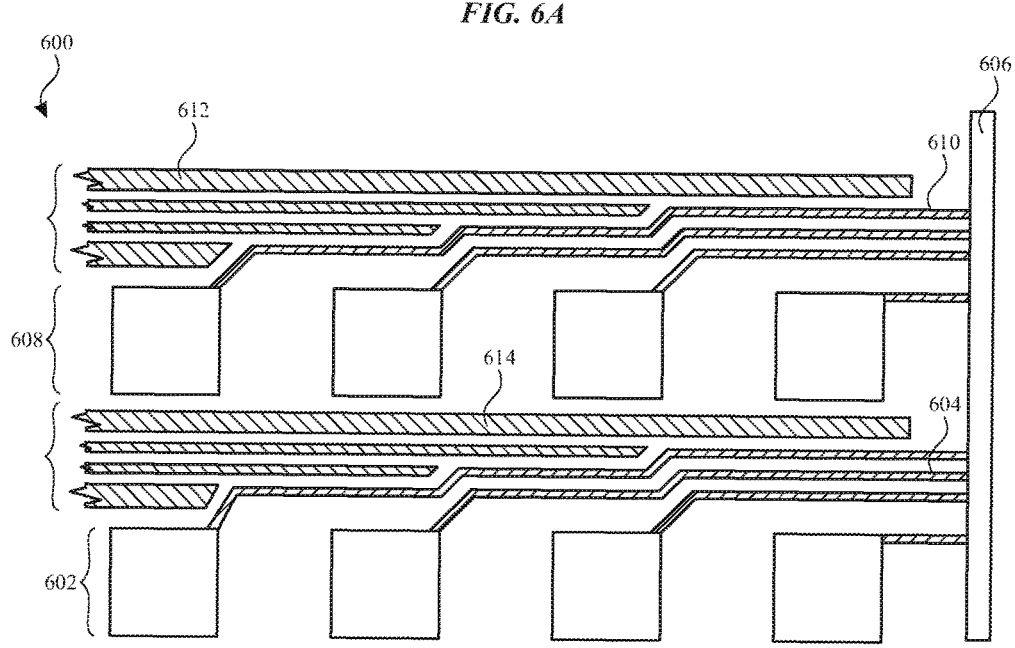

In some instances, the dummy sections can be multi-functional and configured as a shield. FIGS. 6A-6B illustrate top views of exemplary rows of touch electrodes, routing traces, and dummy traces adjacent to the routing traces according to examples of the disclosure. Two exemplary rows and four columns of touch electrodes 602 and 608 are shown for clarity purposes, while it should be understood that examples of the disclosure are not limited to this number of rows and columns of touch electrodes. Touch electrodes 602 and 608 can be coupled to sense circuitry 606 via routing traces 604 and 610, respectively.

As shown in FIG. 6A, the configuration of routing traces 606 and 610 can be such that gaps between routing traces located in the same channel (i.e., the area between adjacent rows of touch electrodes) are minimized while maintaining electrical isolation between routing traces, touch electrodes, dummy electrodes, or a combination thereof. For example, the routing traces can include a plurality of first sections and a plurality of second sections to form one or more bends (e.g., a stair-step pattern) to route near the touch electrodes 602 and 608 and around other routing traces 604 and 610, respectively. In some examples, one or more first sections can be oriented along a first direction (e.g., to the right) and one or more second sections oriented along a second direction (e.g. at a non-orthogonal angle). In some examples, the second section can intersect the first section at a non-orthogonal angle. In some examples, dummy sections or traces 612 and 614 can be located in areas between the touch electrodes (e.g., touch electrodes 608) of one row and routing traces (e.g., routing trace 604) corresponding to an adjacent row. In some examples, dummy sections or traces 612 and 614 can be located in the same layer as touch electrodes 602 and 608 and routing traces 604 and 610. In some examples, one or more dummy sections or traces can include a first edge with the stair-step pattern and a second edge without the stair-step pattern.

In some examples, dummy traces 612 and 614 can be floating (e.g., unconnected) or electrically coupled to a voltage source or ground (not shown) to reduce unwanted capacitive coupling between touch electrodes in adjacent rows (e.g., touch electrodes 602 and 608) and/or between touch electrodes in one row and routing traces corresponding to an adjacent row (e.g., touch electrodes 608 and routing traces 604). In some examples, dummy traces 612 and 614 can be coupled to the same AC voltage source that is used to stimulate the touch electrodes. In some examples, dummy traces 612 and 614 can include the same material as touch electrodes 602 and 608 and/or routing traces 604 and 610, as described above. In some examples, touch electrodes 602 and 608 and/or routing traces 604 and 610 can have one or more properties and/or functions as described with reference to touch electrodes 302 and routing traces 304 of FIG. 3A. It should be understood that routing traces 604, 610, 612, and/or 614 (or any other traces on touch screen 600) need not be straight lines with sharp edges, but they can be rounded and/or wavy. In some examples, sense circuitry 606 (or other outputs) can be configured as described above with reference to sense circuitry 304 (or other outputs) of FIG. 3A.

In some examples, the dummy traces can include a plurality of segments. As shown in FIG. 6B, the plurality of segments have ends located at the bends of the routing traces (e.g., routing trace 604). In some instances, the width of a given dummy trace may be the same throughout and may include a single linear segment running along the same plane. The ends of adjacent dummy traces may be located at different locations. Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

Figure 7:
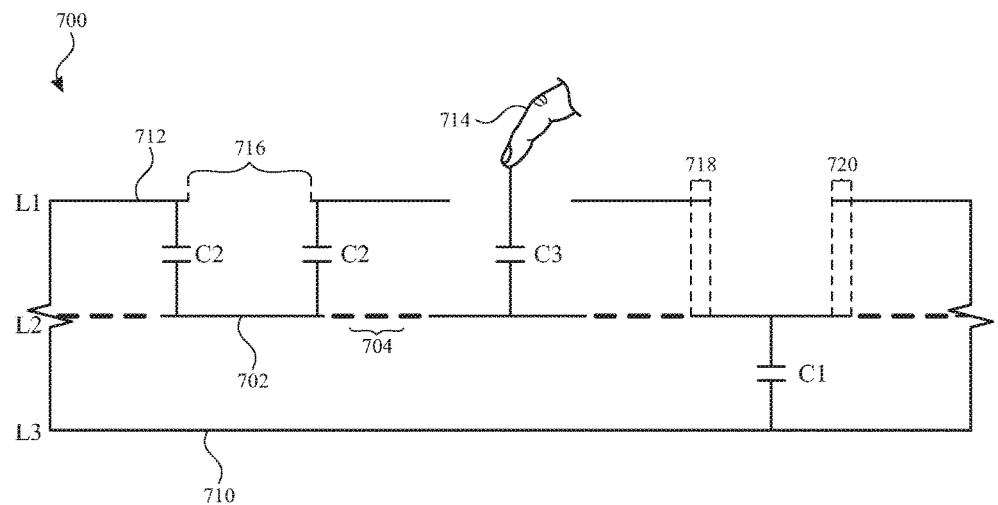
FIG. 7 illustrates a cross-sectional view of an exemplary partial stackup of a touch screen according to examples of the disclosure.

In some examples, the dummy sections can be configured to reduce capacitance coupling (e.g., stray capacitance). FIG. 7 illustrates a cross-sectional view of an exemplary partial stackup of a touch screen (or touch sensor panel) according to examples of the disclosure. Touch screen 700 can include a first layer L1 located closer to the external housing of the touch sensor panel or touch object 714 than second layer L2 and third layer L3. The first layer L1 of exemplary touch screen 700 can include a guard 712 comprising sections of conductive material (e.g., ITO) that can be electrically coupled to a voltage source or ground and sections of gaps 716. In some examples, this voltage source can be the same AC voltage source that is used to stimulate the touch electrodes. The second layer L2 of the stackup can include a plurality of touch electrodes 702, traces 704, and sense circuitry (not shown) that can have the one or more configurations as the touch electrodes, routing traces, and sense circuitry as described above with reference to FIGS. 3A-B, FIGS. 4A-4B, FIGS. 5A-5B, FIGS. 6A-6B, or a combination thereof.

Gaps 716 can expose touch electrodes 702 to the touch object 714. In some examples, guard 712 can partially overlap a portion of one or more touch electrodes (e.g., sections 718 and 720 can overlap with a portion of touch electrode 702). This configuration can allow capacitive coupling C3 between touch object 714 and touch electrode(s) 702 (e.g., to detect a touch or proximity event as described above) while reducing or eliminating unwanted capacitive coupling between touch object 714 and routing traces 704 (e.g., to eliminate false positive touches). In some instances, the configuration can create capacitive coupling C2 at the portions of touch electrode 702 that overlap with guard 712. The third layer L3 can include a continuous guard layer 710. In some examples, guard layer 710 can include a conductive material (e.g., ITO) that can be electrically coupled to a voltage source (e.g., the guard layer 710 can be driven by a voltage source to form a shield) or ground. In some examples, this voltage source can be the same AC voltage source that is used to stimulate the touch electrodes. While this configuration can help isolate touch electrodes 702 and routing traces 704 from noise below the third layer (e.g., display circuitry that can interfere with the ability of touch electrodes 702 to detect changes in capacitance), it can create capacitive coupling C1 between guard layer 710 and touch electrodes 702. Large values of capacitive coupling C1 and C2 can act to reduce the circuit sensitivity to changes in capacitive C3 (e.g., reduce touch sensitivity). In some examples, the stray capacitance can be reduced by driving the same potential to both the guard layer and the touch electrodes.

Figure 8:
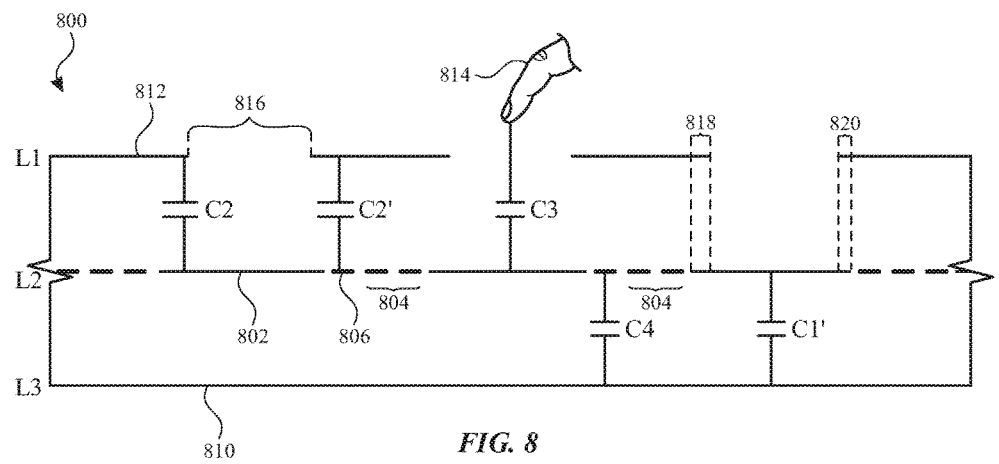
FIG. 8 illustrates a cross-sectional view of an exemplary partial stackup of a touch screen with dummy traces according to examples of the disclosure.

FIG. 8 illustrates a cross-sectional view of an exemplary partial stackup of a touch screen with dummy traces according to examples of the disclosure. The first layer L1 of touch screen 800 can include a guard 812 that can include one or more properties and/or functions as guard 712 of FIG. 7. The second layer L2 of the exemplary stackup can include a plurality of touch electrodes 802, routing traces 804, dummy traces 806, and sense circuitry (not shown) that can include one or more configurations as the touch electrodes, routing traces, dummy traces, and sense circuitry of FIGS. 5A-5B and/or FIGS. 6A-6B. The third layer L3 can include a guard layer 810 with one or more properties and/or functions as guard layer 710 of FIG. 7. In some examples, dummy traces 806 can be tied to a voltage source or ground (e.g., as described above with reference to FIGS. 5A, 5B, and/or 6). This configuration can allow capacitive coupling C2 between dummy traces 806 and guard 812 and capacitive coupling C4 between dummy traces 806 and guard layer 810. In some examples, dummy traces 806 can be configured on both sides of the touch electrodes 802. Since the dummy traces 806 can act as a guard when tied to a voltage source or ground, the overlap between touch electrodes 802 and guard 812 at segment 820 and/or segment 818 can be reduced or removed entirely. Thus, in some examples, the size of gaps 816 can be increased (e.g., gaps 816 can be larger than gaps 716 of FIG. 7) to expose more or all of the surface area of the touch electrodes 802 in the second layer L2. Exposing a larger area of touch electrodes 802 to touch object 814 can enhance the amount of capacitive coupling C3 between touch object 814 and touch electrodes 802, thereby improving the touch sensitivity of the touch panel. In some examples, the area of touch electrode 802 (e.g., touch electrodes 408 and/or 410 illustrated in FIG. 4B) can be decreased (e.g., relative to the area of touch electrodes 308 and/or 310 illustrated in FIG. 3B). The reduced area of touch electrode 802 can reduce the capacitive coupling C1 (i.e., capacitive coupling between the second layer L2 and the third layer L3), further enhancing the circuit sensitivity to capacitive coupling C3.

Figure 9A:
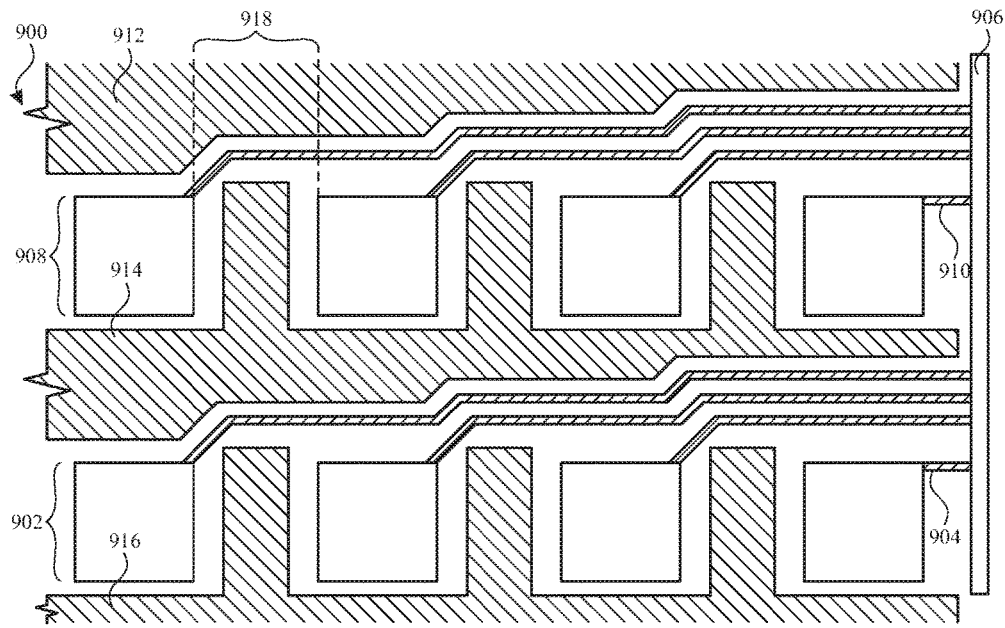
FIGS. 9A-9C illustrate top views of exemplary rows of touch electrodes, routing traces, and dummy traces adjacent to the routing traces and between touch electrodes according to examples of the disclosure.
Figure 9B:
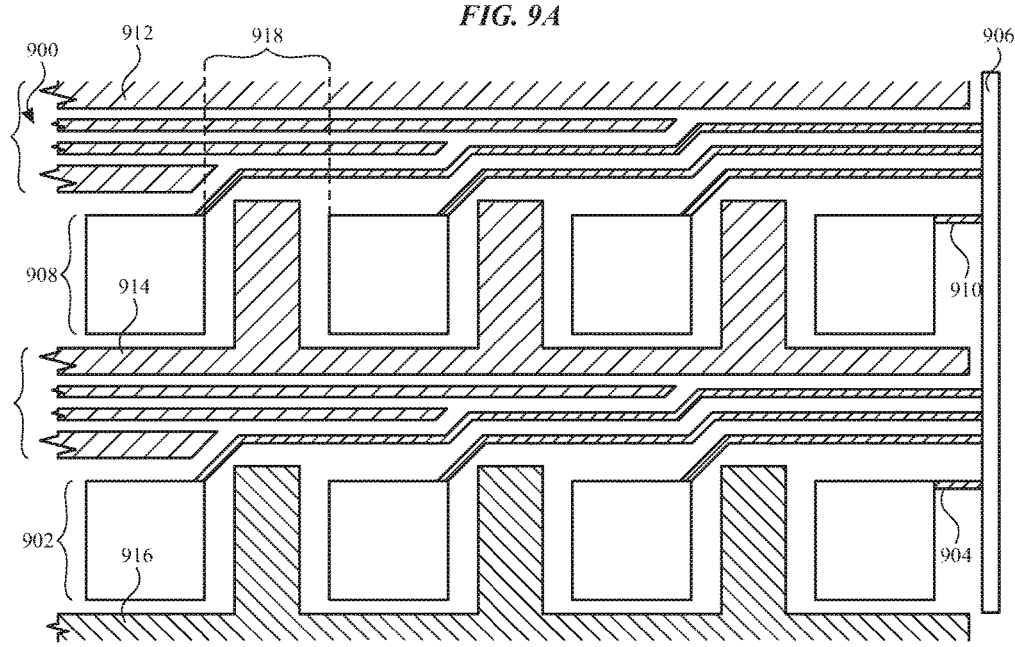
Figure 9C:
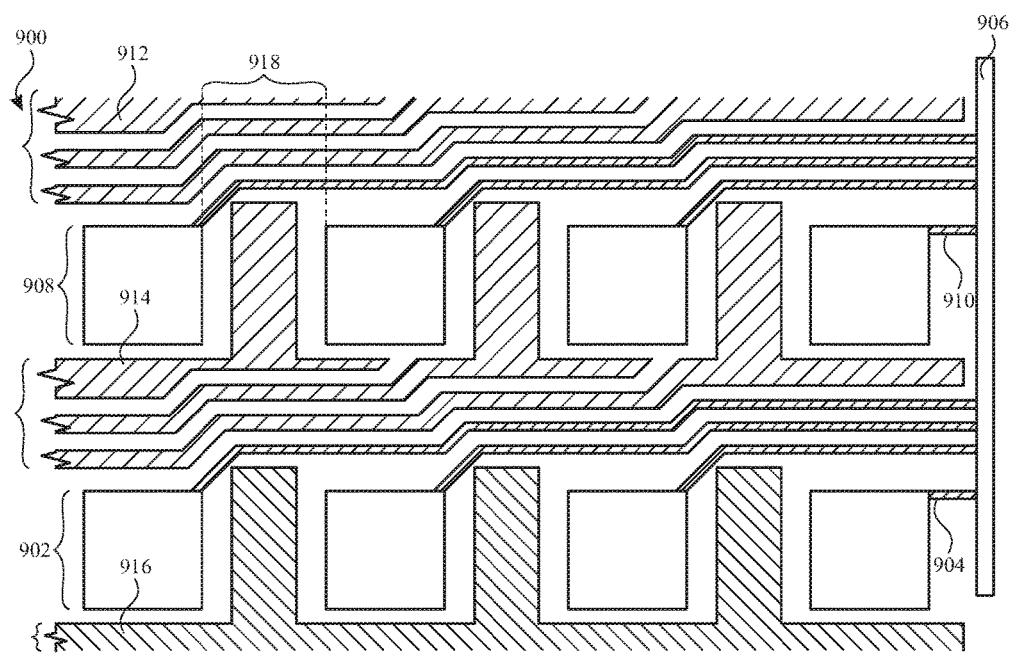

In some examples, portions of the dummy traces can be routed between columns of touch electrodes. FIGS. 9A-9C illustrate top views of exemplary rows of touch electrodes, routing traces, and dummy traces adjacent to the routing traces and between touch electrodes according to examples of the disclosure. Two rows and four columns of touch electrodes 902 and 908 are shown for clarity purposes, while it should be understood that examples of the disclosure are not limited to this number of rows and columns of touch electrodes. Touch electrodes 902 and 908 can be coupled to sense circuitry 906 via routing traces 904 and 910, respectively.

As shown in FIG. 9A, in some examples, the routing traces can include one or more bends (e.g., stair-step pattern) to minimize any gaps or spacing between touch electrodes in one row and routing traces corresponding to an adjacent row (e.g., as described above with reference to FIG. 6A). In some instances, this configuration can increase the distance between adjacent rows of touch electrodes (e.g., the distance between touch electrodes 902 and 908), which can lead to varying positional accuracy (e.g., touch accuracy) amongst the X-axis and Y-axis. In some examples, the distance between adjacent touch electrodes in the same row can be increased (e.g., distance 918) to increase touch accuracy uniformity amongst the X-axis and Y-axis. In some examples, dummy traces 912, 914, and/or 916 can be located in the areas between adjacent rows of touch electrodes (e.g., as described above with reference to FIG. 6A) and in the areas between adjacent touch electrodes in the same row to improve optics (e.g., as described above with reference to FIGS. 5A, 5B, and 6). In some examples, dummy traces 912, 914, and/or 916 can be floating (e.g., unconnected) or can be electrically coupled to a voltage source or ground (not shown) to reduce unwanted capacitive coupling between touch electrodes 902 and 908, between adjacent touch electrodes in the same row, and/or between touch electrodes 908 and routing traces 904. In some examples, this voltage source can be the same AC voltage source that is used to stimulate the touch electrodes. In some examples, dummy traces 912, 914, and/or 916 can include the same material as touch electrodes 902 and 908 and routing traces 904 and 910. In some examples, touch electrodes 902 and 908 and routing traces 904 and 910 can have one or more properties and/or functionality as described with reference to touch electrodes 302 and routing traces 304 of FIG. 3A. It should be understood that routing traces 904 and 910 (or any other traces on touch screen 900) need not be straight lines with sharp edges, but they can be rounded and/or wavy. In some examples, sense circuitry 906 (or other outputs) can be configured as described above with reference to sense circuitry 304 (or other outputs) of FIG. 3A.

In some examples, the dummy traces can include a plurality of segments. As shown in FIG. 9B, the plurality of segments have ends located at the bends of the routing traces (e.g., routing trace 904). Further, the segments located in the areas between adjacent touch electrodes in the same row can be connected together. In some instances, the width of a given dummy trace may be the same throughout and may include a single linear segment running along the same plane. The ends of adjacent dummy traces may be located at different locations. In some examples, the ends of the dummy traces may coincide with the edges of the touch electrodes (e.g., touch electrodes 902). Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

In some examples, the dummy traces can include one or more bends that follow the bends of the routing traces (e.g., routing trace 904) as shown in FIG. 9C. The segments located in areas between adjacent touch electrodes in the same row may not be connected together. As illustrated in the figure, the dummy traces may have the same width throughout. Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

Figure 9D:
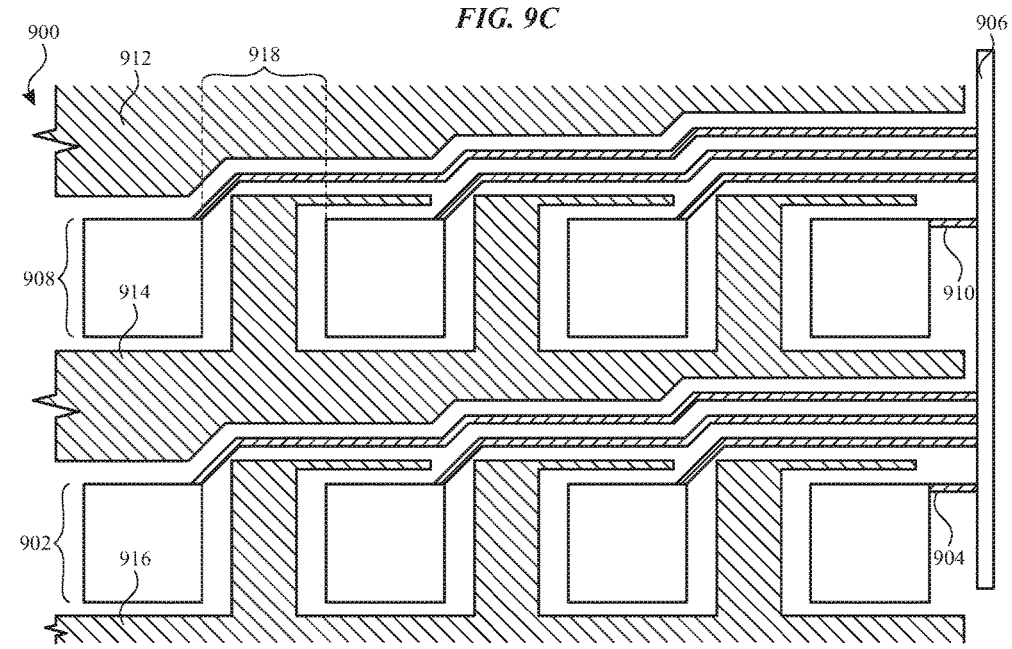
FIGS. 9D-9F illustrate top views of exemplary rows of touch electrodes, routing traces, and dummy traces surrounding the touch electrodes according to examples of the disclosure.
Figure 9E:
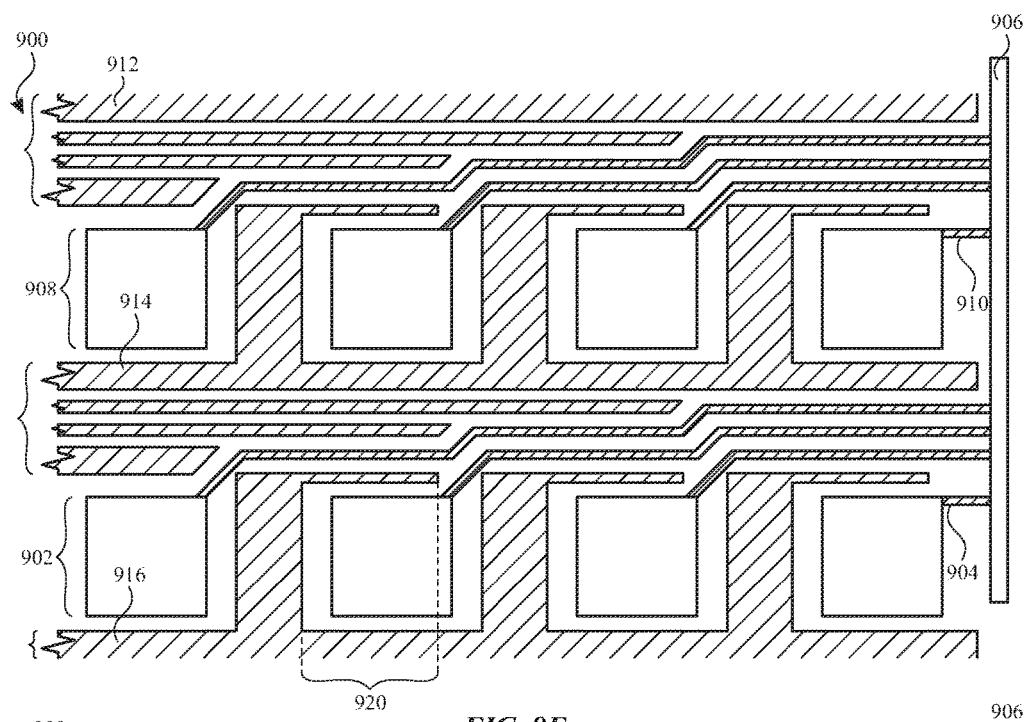
Figure 9F:
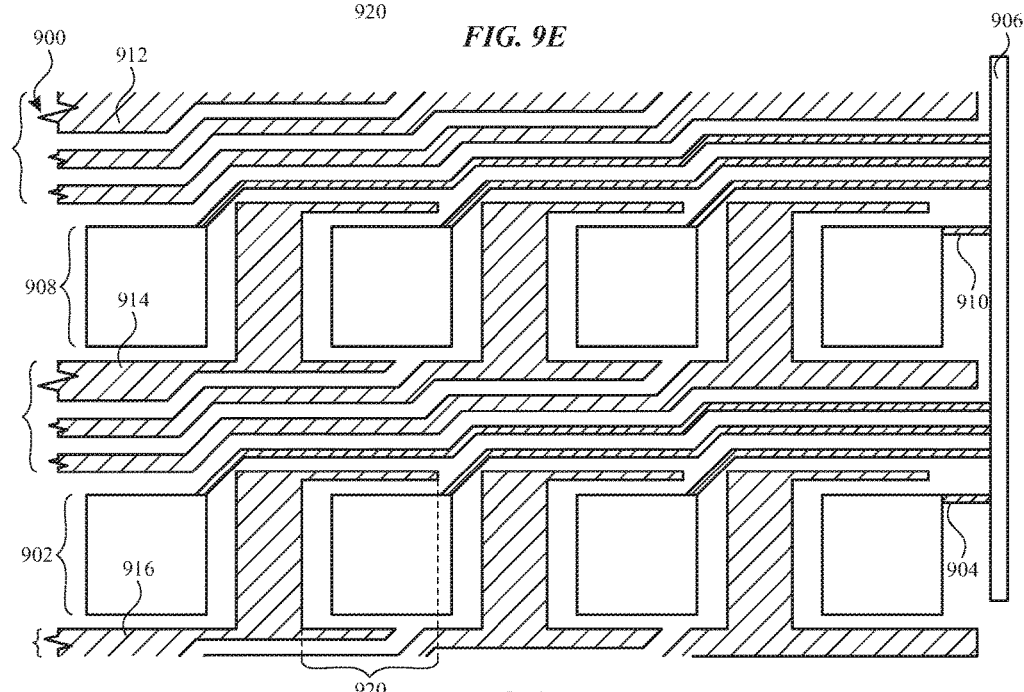

FIGS. 9D-9F illustrate top views of exemplary rows of touch electrodes, routing traces, and dummy traces surrounding the touch electrodes according to examples of the disclosure. As shown in FIG. 9D, dummy traces 914 and 916 can include sections located in area 920 (e.g., the area between a touch electrode and routing trace corresponding to an adjacent touch electrode in the same row). In some examples, dummy traces 912, 914, and/or 916 can be floating (e.g., unconnected) or electrically coupled to a voltage source or ground (not shown) to reduce unwanted capacitive coupling between touch electrodes 902 and 908, between touch electrodes and traces from other touch electrodes in the row, between adjacent touch electrodes in the same row, and/or between touch electrodes 908 and traces 904. In some examples, this voltage source can be the same AC voltage source that is used to stimulate the touch electrodes. It should be understood that FIG. 9D shows only four touch electrodes per row for simplicity, and that a configuration with additional touch electrodes is included in examples of the disclosure.

In some examples, the dummy traces can include a plurality of segments. As shown in FIG. 9E, the plurality of segments have ends located at the bends of the routing traces (e.g., routing trace 904). Further, the segments located in the areas between adjacent touch electrodes in the same row can be connected together. In some instances, the width of a given dummy trace may be the same throughout and may include a single linear segment running along the same plane. The ends of adjacent dummy traces may be located at different locations. In some examples, the ends of the dummy traces may coincide with the edges of the touch electrodes (e.g., touch electrodes 902). Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

In some examples, the dummy traces can include one or more bends that follow the bends of the routing traces (e.g., routing trace 904) as shown in FIG. 9F. The segments located in areas between adjacent touch electrodes in the same row may not be connected together. As illustrated in the figure, the dummy traces may have the same width throughout. Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

Figure 10A:
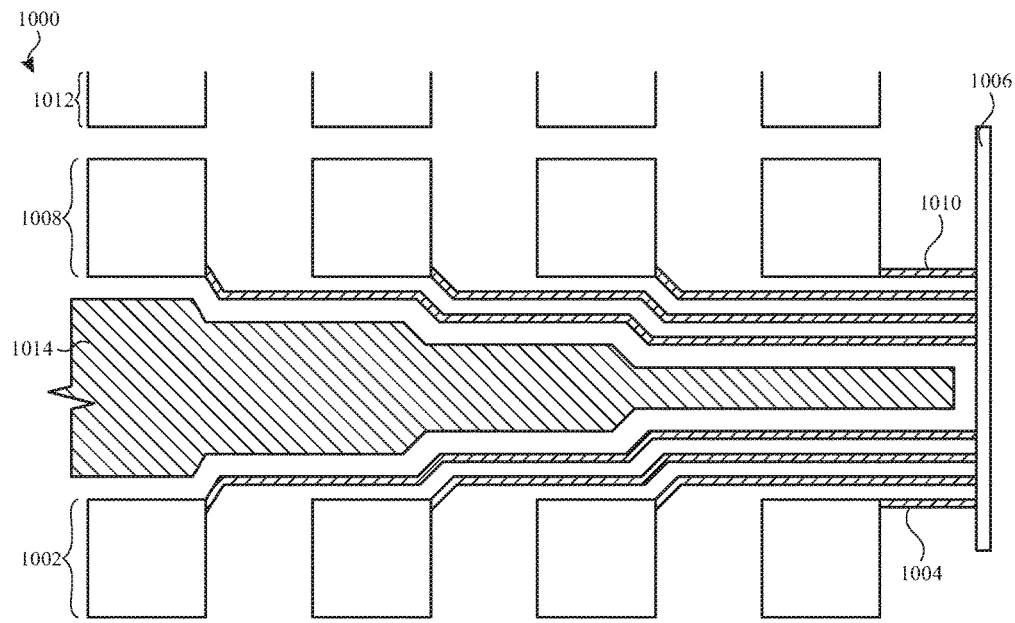
FIGS. 10A-10C illustrate top views of exemplary rows of touch electrodes, where the routing traces and dummy traces corresponding to adjacent rows are located in the same channel according to examples of the disclosure.
Figure 10B:
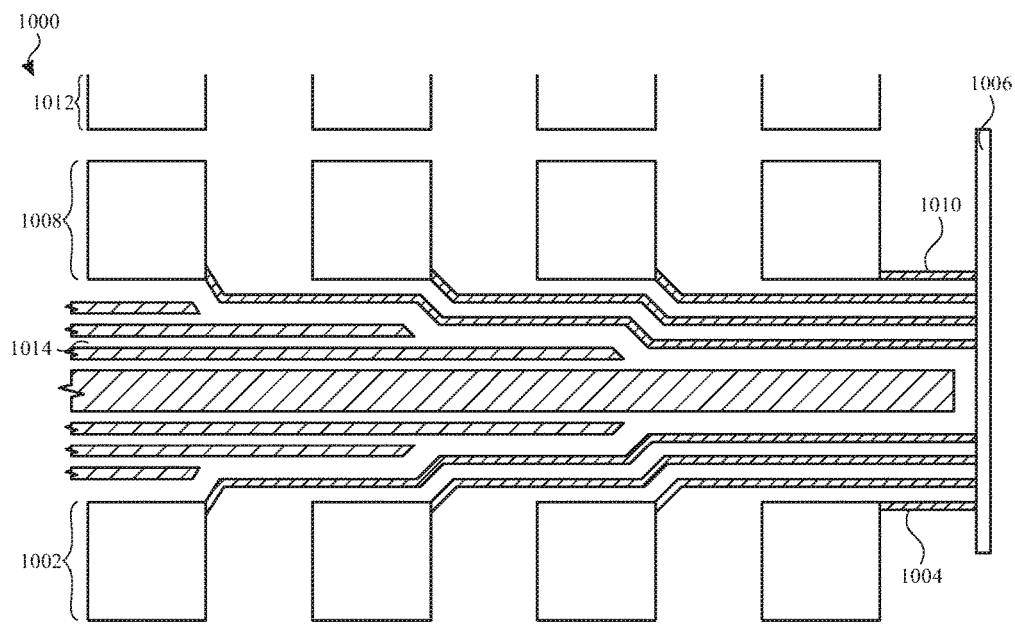
Figure 10C:
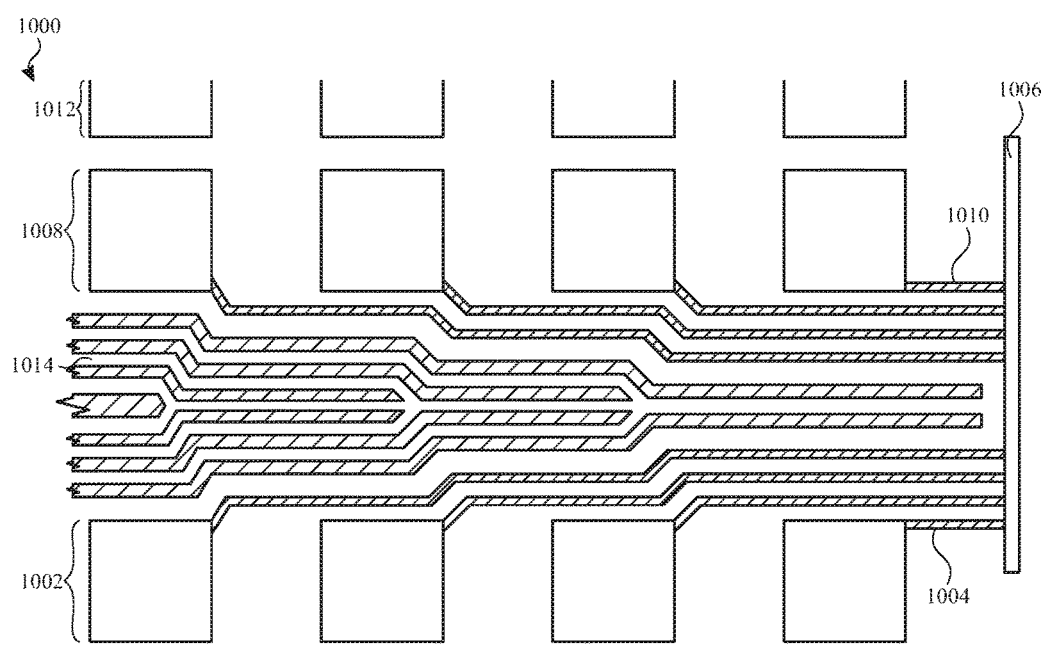

In some examples, a channel can include routing traces corresponding to touch electrodes from different rows. FIGS. 10A-10C illustrate top views of exemplary rows of touch electrodes, where the routing traces and dummy traces corresponding to adjacent rows are located in the same channel according to examples of the disclosure. Touch electrodes 1002 and 1008 can be coupled to sense circuitry 1006 via routing traces 1004 and 1010, respectively. In some examples, touch electrodes 1012 can be similarly coupled to sense circuitry 1006 or any other sense circuitry (or output) of touch screen 1000. It should be understood that FIGS. 10A-10C show only four touch electrodes per row for simplicity, and that a configuration with additional touch electrodes is possible.

The routing traces 1004 and 1010 can be routed in the same channel located between the corresponding touch electrodes 1002 and 1008, respectively. In some examples, routing traces 1004 and 1010 can be configured such that the routing traces substantially fill the channel. For example, routing traces 1004 of touch electrodes 1002 can be routed such that the routing traces 1004 that are further away from the sense circuitry 1006 can be routed around the routing traces 1004 of the other touch electrodes 1002 that are closer to the sense circuitry 1006 (e.g., as described above with reference to FIG. 6A). Similarly, routing traces 1010 of touch electrodes 1008 can be routed in the same channel as routing traces 1004 and in the same manner as routing traces 1004 (e.g., the routing traces 1010 located further away from the sense circuitry 1006 can be routed around the routing traces of other touch electrodes 1008 that can be closer to the sense circuitry 1006.

As shown in FIG. 10A, in some examples, one or more dummy sections or traces 1014 can be between routing traces 1004 and 1010. In some examples, dummy traces 1014 can be floating (e.g., unconnected) or can be electrically coupled to a voltage source or ground (not shown) to reduce unwanted capacitive coupling between touch electrodes 1002 and 1008, between touch electrodes 1002 and routing traces 1010, and/or between touch electrodes 1008 and traces 1004. In some examples, this voltage source can be the same AC voltage source that is used to stimulate the touch electrodes. In some examples, dummy traces 1014 can include the same material as touch electrodes 1002, 1008, and 1012 and routing traces 1004 and 1010. In some examples, touch electrodes 1002, 1008, and 1012 and traces 1004 and 1010 can have one or more properties and/or functions as described with reference to touch electrodes 302 and routing traces 304 of FIG. 3A. It should be understood that routing traces 1004 and 1010 (or any other traces on touch screen 1000) need not be straight lines with sharp edges, but they can be rounded and/or wavy. In some examples, sense circuitry 1006 (or other outputs) can be configured as described above with reference to sense circuitry 304 (or other outputs) of FIG. 3A.

In some examples, alternating channels (i.e., areas between adjacent rows of touch electrodes) can include routing traces and/or dummy traces. For example, the channel between touch electrodes 1002 and 1008 can include routing traces 1004 and 1010 and dummy traces 1014, while the channel between touch electrodes 1008 and 1012 may exclude routing traces and dummy electrodes. In some examples, dummy traces can be routed between touch electrodes 1008 and 1012. In some examples, these dummy traces can be floating (e.g., unconnected) or electrically coupled to a voltage source or ground to reduce unwanted capacitive coupling between touch electrodes 1008 and 1012. In some examples, this voltage source can be the same AC voltage source that is used to stimulate the touch electrodes.

In some examples, the dummy traces can include a plurality of segments. As shown in FIG. 10B, the plurality of segments have ends located at the bends of the routing traces (e.g., routing trace 1004). Further, the segments located in the areas between adjacent touch electrodes in the same row can be connected together. In some instances, the width of a given dummy trace may be the same throughout and may include a single linear segment running along the same plane. The ends of adjacent dummy traces may be located at different locations. In some examples, the ends of the dummy traces may coincide with the edges of the touch electrodes (e.g., touch electrodes 1002). Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

In some examples, the dummy traces can include one or more bends that follow the bends of the routing traces (e.g., routing trace 1004) as shown in FIG. 10C. The segments located in areas between adjacent touch electrodes in the same row may not be connected together. As illustrated in the figure, the dummy traces may have the same width throughout. Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

Figure 11A:
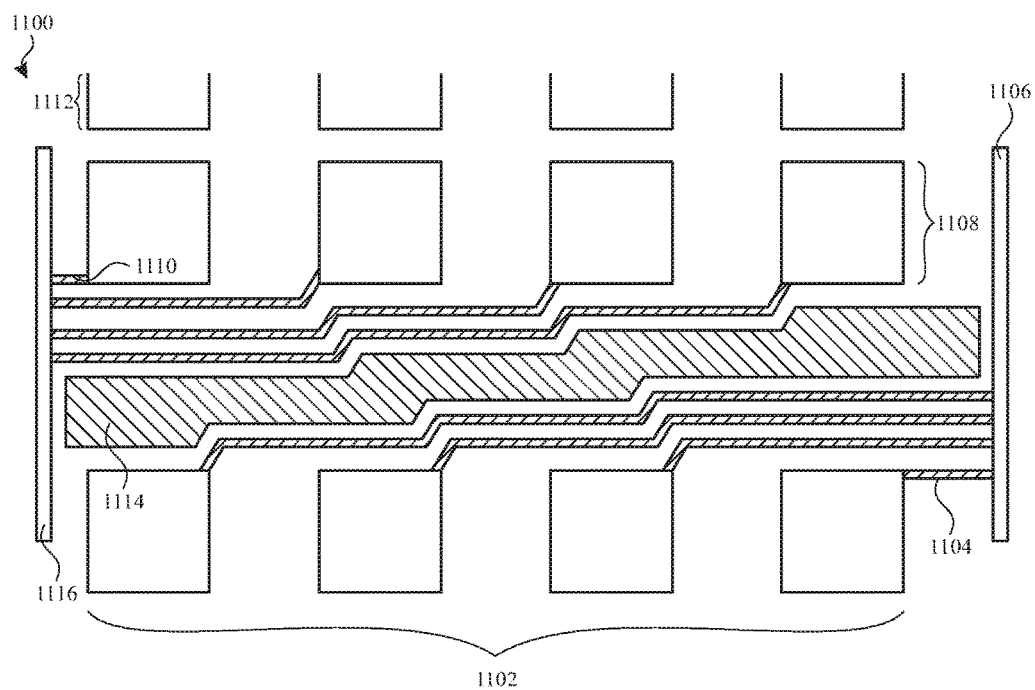
FIGS. 11A-11C illustrate a top view of exemplary rows of touch electrodes, where the routing traces and dummy traces corresponding to adjacent rows are located in the same channel, while the routing traces are coupled to different sense circuitry according to examples of the disclosure.
Figure 11B:
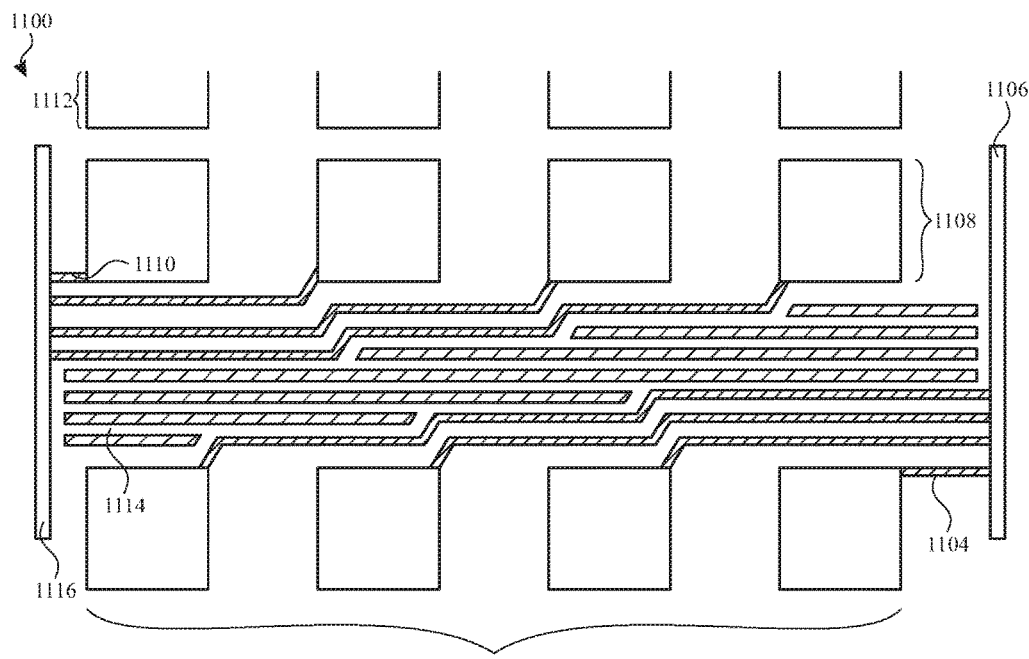
Figure 11C:
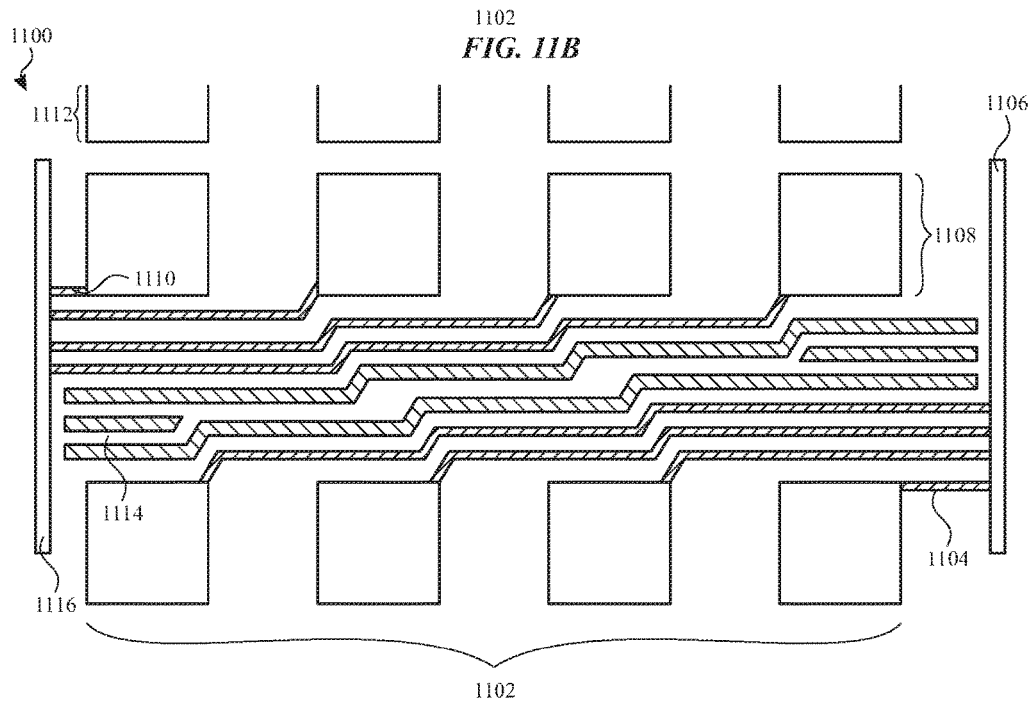

In some examples, a channel can include routing traces coupled to sense circuitry located on different edges of the touch screen. FIGS. 11A-11C illustrate top views of exemplary rows of touch electrodes, where the routing traces and dummy traces are coupled to different sense circuitry according to examples of the disclosure. Touch electrodes 1102 can be coupled to sense circuitry 1106 on one side of touch screen 1100 via routing traces 1104. Touch electrodes 1108 can be coupled to sense circuitry 1116 on another side of touch screen 1100 (e.g., the opposite side of sense circuitry 1106) via routing traces 1110. In some examples, touch electrodes 1112 can be similarly coupled to sense circuitry 1106, 1116, or any other sense circuitry (or output) on touch screen 1100. It should be understood that FIGS. 11A-11C show only four touch electrodes per row for simplicity, and that a configuration with additional touch electrodes is possible.

As shown in FIG. 11A, the routing traces 1104 and 1110 can be routed in the same channel but to different sense circuitry 1106 and 1116, respectively. In some examples, dummy traces 1114 can be included in the channel. For example, dummy trace 1114 can be located between routing traces 1104 and 1110. In some examples, dummy traces 1114 can be floating (e.g., unconnected) or electrically coupled to a voltage source or ground (not shown) to reduce unwanted capacitive coupling between routing traces 1104 and 1110. In some examples, this voltage source can be the same AC voltage source that is used to stimulate the touch electrodes. In some examples, dummy traces 1114 can include the same material as touch electrodes 1102, 1108, and 1112 and routing traces 1104 and 1110. In some examples, touch electrodes 1102, 1108, and 1112 and routing traces 1104 and 1110 can have the same properties as described with reference to touch electrodes 302 and traces 304 of FIG. 3A. It should be understood that routing traces 1104 and 1110 (or any other traces on touch screen 1100) need not be straight lines with sharp edges, but they can be rounded and/or wavy. In some examples, sense circuitry 1106 and/or 1116 (or other outputs) can be configured as described above with reference to sense circuitry 304 (or other outputs) of FIG. 3A. In some examples, alternating channels (i.e., areas between adjacent rows of touch electrodes) can include routing traces and/or dummy traces. The other channels can exclude any routing traces and/or dummy traces.

In some examples, the dummy traces can include a plurality of segments. As shown in FIG. 11B, the plurality of segments have ends located at the bends of the routing traces (e.g., routing trace 1104). Further, the segments located in the areas between adjacent touch electrodes in the same row can be connected together. In some instances, the width of a given dummy trace may be the same throughout and may include a single linear segment running along the same plane. The ends of adjacent dummy traces may be located at different locations. In some examples, the ends of the dummy traces may coincide with the edges of the touch electrodes (e.g., touch electrodes 1102). Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

In some examples, the dummy traces can include one or more bends that follow the bends of the routing traces (e.g., routing trace 1104) as shown in FIG. 11C. The segments located in areas between adjacent touch electrodes in the same row may not be connected together. As illustrated in the figure, the dummy traces may have the same width throughout. Although the figure illustrates the dummy traces as having the same width throughout, examples of the disclosure can include dummy traces having varying widths. Although the figure illustrates the dummy traces as having the same spacing between adjacent dummy traces, examples of the disclosure can include different spacings between adjacent pairs of dummy traces.

Figure 13:
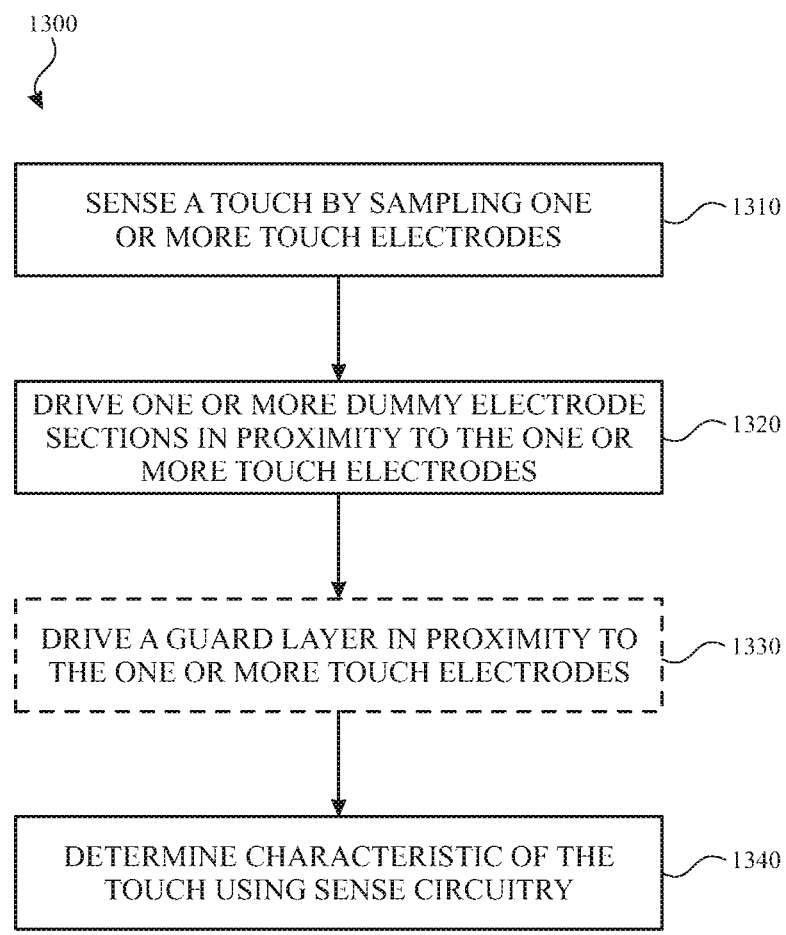
FIG. 13 illustrates an exemplary process for operating a touch sensor panel according to examples of the disclosure.

FIG. 13 illustrates exemplary process 1300 for operating a touch sensor panel according to examples of the disclosure. At step 1310, process 1300 can sense a touch (e.g., sense a touch event by detecting changes in the self-capacitance and/or mutual capacitance of the conductive plates or touch electrodes of the touch sensor panel) by sampling the plurality of touch electrodes at a touch scanning frequency. The touch scanning frequency can be based on characteristics (e.g., size, shape, etc.) of one or more touch electrodes. In some examples, the characteristics of one or more touch electrodes can be the same (e.g., as described above). Examples of the disclosure include "same" as including 15% deviation from equal. At step 1320, process 1300 can drive one or more dummy electrode sections in proximity to one or more touch electrodes (e.g., as described above). In some examples, driving the one or more dummy electrode sections can reduce unwanted capacitive coupling on the touch sensor panel as described above. In some examples, process 1300 can drive a guard layer in proximity to the one or more touch electrodes and the one or more dummy electrode sections to reduce unwanted capacitive coupling (e.g., as described above with reference to FIGS. 7 and 8) at step 1330. At step 1340, process 1300 can determine characteristics of the touch using sense circuitry (e.g., determine the positions of multiple fingers or objects when they touch, or come in proximity to, the touch sensor panel). In some examples, steps 1310-1340 can be performed in any order. In some examples, steps 1310-1340 can be performed concurrently or sequentially.

Thus, the examples of the disclosure provide various ways to enhance the performance (e.g., responsivity, sensitivity, etc.) and improve optical uniformity of a touch sensor panel.

Therefore, according to the above, some examples of the disclosure are directed to a touch sensor panel comprising: a plurality of touch electrodes, an area of one or more touch electrodes being the same; one or more channels located between adjacent rows of the plurality of touch electrodes; a plurality of routing traces located in the one or more channels and configured to electrically couple the plurality of touch electrodes to sense circuitry, the plurality of routing traces located on the same layer as the plurality of touch electrodes; one or more dummy traces located on the same layer as the plurality of touch electrodes and the plurality of routing traces; and a guard layer configured to capacitively couple to the one or more dummy traces. Additionally or alternatively to one or more of the examples disclosed above, in some examples, at least one routing trace includes a first section and a second section, the first section electrically coupling the second section to the sense circuitry and oriented along a first direction, and the second section electrically coupling the first section to a touch electrode and oriented along a second direction different from the first direction. Additionally or alternatively to one or more of the examples disclosed above, in some examples, the second section intersects the first section at a non-orthogonal angle. Additionally or alternatively to one or more of the examples disclosed above, in some examples, at least one routing trace includes a plurality of first sections and a plurality of second sections to form a stair-step pattern, one or more first sections is oriented along a first direction, and one or more second sections is oriented along a second direction, different from the first direction. Additionally or alternatively to one or more of the examples disclosed above, in some examples, the one or more dummy traces are located between at least one of the plurality of touch electrodes and at least one of the plurality of routing traces, wherein one or more dummy traces includes a first edge and a second edge, the first edge including a stair-step pattern. Additionally or alternatively to one or more of the examples disclosed above, in some examples, the plurality of touch electrodes includes a first plurality of touch electrodes and a second plurality of touch electrodes; the plurality of routing traces includes a first set of routing traces and a second set of routing traces; the first plurality of touch electrodes are configured for being electrically couplable to the sense circuitry via the first set of routing traces, wherein the first set of routing traces are configured such that a first routing trace of a first touch electrode of the first plurality of touch electrodes is routed around a first routing trace subset of the first set of routing traces of a first touch electrode subset of the first plurality of touch electrodes that are closer to the sense circuitry; and the second plurality of touch electrodes are configured for being electrically couplable to the sense circuitry via the second set of routing traces, wherein the second set of routing traces are configured such that a second routing trace of a second touch electrode of the second set of electrodes is routed around a second routing trace subset of the second set of routing traces of a second touch electrode subset of the second plurality of touch electrodes that are closer to the sense circuitry. Additionally or alternatively to one or more of the examples disclosed above, in some examples, the guard layer comprises a plurality of sections of conductive material separated by sections of gaps. Additionally or alternatively to one or more of the examples disclosed above, in some examples, the one or more dummy traces are electrically coupled to a voltage source or ground. Additionally or alternatively to one or more of the examples disclosed above, in some examples, the voltage source is the same AC voltage source that stimulates the touch electrodes. Additionally or alternatively to one or more of the examples disclosed above, in some examples, one or more routing trace includes a first section and a second section, the first section configured for electrically coupling the second section to the sense circuitry and oriented along a first direction, and the second section electrically coupling the first section to a touch electrode and oriented along a second direction, and one or more dummy traces is oriented along the first direction. Additionally or alternatively to one or more of the examples disclosed above, in some examples, one or more dummy traces include a first section located between adjacent touch electrodes of a given row. Additionally or alternatively to one or more of the examples disclosed above, in some examples, one or more dummy traces include a second section located between a routing trace of a first touch electrode and a second touch electrode, the first touch electrode adjacent to the second touch electrode. Additionally or alternatively to one or more of the examples disclosed above, in some examples, the guard layer is located on a different layer than the plurality of touch electrodes, wherein at least a portion of one or more sections of conductive material overlaps at least a portion of one of the plurality of touch electrodes, and the sections of gaps are configured to allow capacitive coupling between an object and the plurality of touch electrodes. Additionally or alternatively to one or more of the examples disclosed above, in some examples, the plurality of touch electrodes include a first row of touch electrodes and a second row of touch electrodes, the plurality of routing traces, including a plurality of first routing traces, and a plurality of second routing traces, wherein the first row of touch electrodes are electrically coupled to the plurality of first routing traces, wherein the second row of touch electrodes are electrically coupled to the plurality of second routing traces, and wherein the plurality of first routing traces and the plurality of second routing traces are located in one of the one or more channels. Additionally or alternatively to one or more of the examples disclosed above, in some examples, the sense circuitry comprises first sense circuitry located on an edge of the touch screen and second sense circuitry located on an opposite edge of the touch screen; a first row of the plurality of touch electrodes is coupled to the first sense circuitry via a first set of the plurality of routing traces along a channel; and an adjacent second row of the plurality of touch electrodes is coupled to the second sense circuitry via a second set of the plurality of routing traces along first channel.

Some examples of the disclosure are directed to a method of fabricating a touch sensor panel, the method comprising: forming a plurality of touch electrodes, an area of one or more touch electrodes being about the same; forming one or more channels located between adjacent rows of the plurality of touch electrodes; forming a plurality of routing traces in the one or more channels, the plurality of routing traces configured to electrically couple the plurality of touch electrodes to sense circuitry, the plurality of routing traces located on the same layer as the plurality of touch electrodes; forming one or more dummy traces on the same layer; and forming a guard layer, the guard layer configured to capacitively couple to the one or more dummy traces. Additionally or alternatively to one or more of the examples disclosed above, in some examples, the one or more dummy traces are formed in the one or more channels. Additionally or alternatively to one or more of the examples disclosed above, the method further comprises coupling the one or more dummy traces to a voltage source or ground.

Some examples of the disclosure are directed to a method for operating a touch sensor panel, the method comprising: sensing a touch by sampling a plurality of touch electrodes, wherein one or more touch electrodes is sampled at a touch scanning frequency, the touch scanning frequency based on the responsivity and/or sensitivity of one or more touch electrodes, wherein the properties of one or more touch electrodes is about the same; driving one or more dummy electrode sections in proximity to one or more touch electrodes to reduce unwanted capacitive coupling; and determining characteristics of the touch using sense circuitry. Additionally or alternatively to one or more of the examples disclosed above, in some examples, driving a guard layer in proximity to the one or more touch electrodes and the one or more dummy electrode sections to reduce unwanted capacitive coupling.

Although examples have been fully described with reference to the accompanying drawings, it is to be noted that various changes and modifications will become apparent to those skilled in the art. Such changes and modifications are to be understood as being included within the scope of examples of this disclosure, as defined by the appended claims.

The invention claimed is:

1. A touch sensor panel comprising:
a plurality of touch electrodes, an area of two or more of the plurality of touch electrodes being the same;
one or more channels located between adjacent rows of the plurality of touch electrodes;
a plurality of routing traces located in the one or more channels and configured to electrically couple the plurality of touch electrodes to sense circuitry, the plurality of routing traces located on a same layer as the plurality of touch electrodes;
one or more dummy traces located on the same layer as the plurality of touch electrodes and the plurality of routing traces; and
a guard layer configured to capacitively couple to the one or more dummy traces, wherein:
the guard layer comprises a plurality of sections of conductive material separated by sections of gaps and is located on a different layer than the plurality of touch electrodes;
at least a portion of one of more sections of the conductive material overlaps at least a portion of one of the plurality of touch electrodes; and
the sections of gaps are configured to allow capacitive coupling between an object and the plurality of touch electrodes.

2. The touch sensor panel of claim 1, wherein at least one routing trace includes a first section and a second section,
the first section electrically coupling the second section to the sense circuitry and oriented along a first direction, and
the second section electrically coupling the first section to a touch electrode and oriented along a second direction, different from the first direction.

3. The touch sensor panel of claim 2, wherein the second section intersects the first section at a non-orthogonal angle.

4. The touch sensor panel of claim 1, wherein at least one routing trace includes a plurality of first sections and a plurality of second sections to form a stair-step pattern,
one or more of the plurality of first sections are oriented along a first direction, and
one or more of the plurality of second sections are oriented along a second direction, different from the first direction.

5. The touch sensor panel of claim 1,
wherein the one or more dummy traces are located between at least one of the plurality of touch electrodes and at least one of the plurality of routing traces,
wherein the one or more dummy traces include a first edge and a second edge, the first edge including a stair-step pattern.

6. The touch sensor panel of claim 1, wherein:
the plurality of touch electrodes includes a first plurality of touch electrodes and a second plurality of touch electrodes;
the plurality of routing traces includes a first set of routing traces and a second set of routing traces;
the first plurality of touch electrodes are capable of being electrically coupled to the sense circuitry via the first set of routing traces,
wherein the first set of routing traces includes a first routing trace and first other routing traces and the first plurality of touch electrodes includes a first touch electrode and first other touch electrodes, the first routing trace coupled to the first touch electrode and the first other routing traces coupled to the first other touch electrodes, the first plurality of touch electrodes capable of being electrically coupled to the sense circuitry via the first set of routing traces, and
wherein the first routing trace is routed around the first other routing traces and the first other routing traces are located closer to the sense circuitry than the first touch electrode; and
the second plurality of touch electrodes are capable of being electrically coupled to the sense circuitry via the second set of routing traces,
wherein the second set of routing traces includes a second routing trace and second other routing traces and the second plurality of touch electrodes includes a second touch electrode and second other touch electrodes, the second routing trace coupled to the second touch electrode and the second other routing traces coupled to the second other touch electrodes, the second plurality of touch electrodes capable of being electrically coupled to the sense circuitry via the second set of routing traces, and
wherein the second routing trace is routed around the second other routing traces and the second other routing traces are located closer to the sense circuitry than the second touch electrode.

7. The touch sensor panel of claim 1, wherein the one or more dummy traces are electrically coupled to a voltage source or ground.

8. The touch sensor panel of claim 7, wherein the voltage source is the same AC voltage source that stimulates the plurality of touch electrodes.

9. The touch sensor panel of claim 1, wherein:
one or more of the plurality of routing traces include a first section and a second section,
the first section configured for electrically coupling the second section to the sense circuitry and oriented along a first direction, and the second section configured for electrically coupling the first section to at least one of the plurality of touch electrodes and oriented along a second direction,
wherein at least one of the one or more dummy traces is oriented along the first direction.

10. The touch sensor panel of claim 1, wherein at least one of the one or more dummy traces includes a first section located between adjacent touch electrodes of a given row.

11. The touch sensor panel of claim 10, wherein the at least one of the one or more dummy traces includes a second section located between a first routing trace of the plurality of routing traces and a second routing trace of the plurality of routing traces, the first routing trace coupled to a first touch electrode of the plurality of touch electrodes and a second touch electrode of the plurality of touch electrodes, and
the first touch electrode adjacent to the second touch electrode.

12. The touch sensor panel of claim 1, wherein the plurality of touch electrodes include a first row of touch electrodes and a second row of touch electrodes, the plurality of routing traces including a plurality of first routing traces and a plurality of second routing traces,
wherein the first row of touch electrodes are electrically coupled to the plurality of first routing traces,
wherein the second row of touch electrodes are electrically coupled to the plurality of second routing traces, and
wherein the plurality of first routing traces and the plurality of second routing traces are located in one of the one or more channels.

13. The touch sensor panel of claim 1, wherein:
the sense circuitry comprises:
first sense circuitry located on an edge of the touch sensor panel, and
second sense circuitry located on an opposite edge of the touch sensor panel;
a first row of the plurality of touch electrodes is coupled to the first sense circuitry via a first set of the plurality of routing traces along a channel; and
a second row of the plurality of touch electrodes is coupled to the second sense circuitry via a second set of the plurality of routing traces along the channel,
wherein the first row of the plurality of touch electrodes is adjacent to the second row of the plurality of touch electrodes.

14. A method of fabricating a touch sensor panel, the method comprising:
forming a plurality of touch electrodes, an area of two or more of the plurality of touch electrodes being the same;
forming one or more channels located between adjacent rows of the plurality of touch electrodes;
forming a plurality of routing traces in the one or more channels, the plurality of routing traces configured to electrically couple the plurality of touch electrodes to sense circuitry, the plurality of routing traces located on a same layer as the plurality of touch electrodes;
forming one or more dummy traces on the same layer; and
forming a guard layer, the guard layer configured to capacitively couple to the one or more dummy traces, wherein:
the guard layer comprises a plurality of sections of conductive material separated by sections of gaps and is located on a different layer than the plurality of touch electrodes;
at least a portion of one of more sections of the conductive material overlaps at least a portion of one of the plurality of touch electrodes; and
the sections of gaps are configured to allow capacitive coupling between an object and the plurality of touch electrodes.

15. The method of claim 14, wherein the one or more dummy traces are formed in the one or more channels.

16. The method of claim 15, further comprising:
coupling the one or more dummy traces to a voltage source or ground.

17. A method for operating a touch sensor panel, the method comprising:
sensing a touch by sampling a plurality of touch electrodes, wherein two or more of the plurality of touch electrodes is sampled at a touch scanning frequency, the touch scanning frequency based on one or more properties of the two or more of the plurality of touch electrodes, wherein the one or more properties of the two or more of the plurality of touch electrodes are the same;
driving one or more dummy electrode sections that is in proximity to the one or more of the plurality of touch electrodes to reduce capacitive coupling;
driving a guard layer that is in proximity to the plurality of touch electrodes and the one or more dummy electrode sections to reduce capacitive coupling, wherein:
the guard layer comprises a plurality of sections of conductive material separated by sections of gaps and is located on a different layer than the plurality of touch electrodes;
at least a portion of one of more sections of the conductive material overlaps at least a portion of one of the plurality of touch electrodes; and
the sections of gaps are configured to allow capacitive coupling between an object and the plurality of touch electrodes; and
determining characteristics of the touch using sense circuitry.

* * * * *